US008636573B2

(12) United States Patent
Walker et al.

(10) Patent No.: US 8,636,573 B2
(45) Date of Patent: Jan. 28, 2014

(54) METHOD AND SYSTEM FOR VIDEO POKER

(75) Inventors: Jay S. Walker, Ridgefield, CT (US); James A. Jorasch, Stamford, CT (US); Magdalena M. Fincham, Norwalk, CT (US); Jason Krantz, Madison, WI (US); Victor M. Garcia, New Haven, CT (US); Geoffrey M. Gelman, Stamford, CT (US); Daniel E. Tedesco, Huntington, CT (US); Stephen C. Tulley, Fairfield, CT (US)

(73) Assignee: IGT, Las Vegas, NV (US)

( * ) Notice: Subject to any disclaimer, the term of this patent is extended or adjusted under 35 U.S.C. 154(b) by 923 days.

(21) Appl. No.: 12/784,100

(22) Filed: May 20, 2010
(Under 37 CFR 1.47)

(65) Prior Publication Data

US 2010/0227661 A1 Sep. 9, 2010

Related U.S. Application Data

(63) Continuation of application No. 11/412,438, filed on Apr. 27, 2006, now Pat. No. 7,749,061, which is a continuation of application No. 10/619,066, filed on Jul. 14, 2003, now Pat. No. 7,056,207, which is a continuation-in-part of application No. 09/858,987, filed on May 16, 2001, now Pat. No. 6,592,456, which is a continuation of application No. 09/165,184, filed on Oct. 2, 1998, now Pat. No. 6,257,979.

(51) Int. Cl.
*A63F 9/00* (2006.01)
*G06F 17/00* (2006.01)

(52) U.S. Cl.
USPC ............ 463/13; 273/143 R; 273/292; 273/16; 273/17; 273/20; 273/22

(58) Field of Classification Search
None
See application file for complete search history.

(56) References Cited

U.S. PATENT DOCUMENTS

| | | | |
|---|---|---|---|
| 4,743,022 | A | 5/1988 | Wood |
| 5,322,295 | A | 6/1994 | Cabot et al. |
| 5,377,973 | A | 1/1995 | Jones et al. |
| 5,401,023 | A | 3/1995 | Wood |
| 5,411,257 | A | 5/1995 | Fulton |

(Continued)

OTHER PUBLICATIONS

Website: Blackjacks Online Casino—Paigow Poker:, (http //www blackjacksonlinecasino com/paigow html), download date: Sep. 7, 2001.

(Continued)

*Primary Examiner* — Paul A D'Agostino
(74) *Attorney, Agent, or Firm* — Neal, Gerber & Eisenberg LLP

(57) ABSTRACT

One embodiment of the present invention comprises a method including steps of populating a primary set of card positions with a first set of initial cards, determining at least one discarded card from the first set of initial cards, replacing the at least one discarded card from the first set of initial cards with replacement cards to form a final set of cards, and determining whether to include the at least one discarded card in at least one secondary set of card positions. If the at least one discarded card is to be included in the at least one secondary set of card positions, the method further provides for populating the at least one secondary set of card positions with the at least one discarded card. Some embodiments of the present invention also provide for determining a payout based on at least the final set of cards.

26 Claims, 24 Drawing Sheets

(56) References Cited

U.S. PATENT DOCUMENTS

| | | | | |
|---|---|---|---|---|
| 5,531,441 | A | 7/1996 | Dabrowski et al. | |
| 5,542,669 | A | 8/1996 | Charron et al. | |
| 5,732,950 | A * | 3/1998 | Moody | 273/292 |
| 5,769,716 | A | 6/1998 | Saffari et al. | |
| 5,772,506 | A | 6/1998 | Marks et al. | |
| 5,816,914 | A | 10/1998 | Wichinsky | |
| 5,816,915 | A * | 10/1998 | Kadlic | 463/13 |
| 5,823,873 | A * | 10/1998 | Moody | 463/13 |
| 5,868,619 | A | 2/1999 | Wood et al. | |
| 5,957,774 | A * | 9/1999 | Holmes et al. | 463/13 |
| 6,045,129 | A | 4/2000 | Cooper et al. | |
| 6,048,267 | A | 4/2000 | Wichinsky | |
| 6,050,568 | A | 4/2000 | Hachquet | |
| 6,098,985 | A * | 8/2000 | Moody | 273/292 |
| 6,135,883 | A | 10/2000 | Hachquet | |
| 6,176,781 | B1 * | 1/2001 | Walker et al. | 463/13 |
| 6,179,711 | B1 | 1/2001 | Yoseloff | |
| 6,257,979 | B1 * | 7/2001 | Walker et al. | 463/13 |
| 6,270,405 | B1 * | 8/2001 | Ferguson | 463/13 |
| 6,334,613 | B1 | 1/2002 | Yoseloff | |
| 6,471,587 | B1 * | 10/2002 | Wood et al. | 463/13 |
| 6,474,645 | B2 | 11/2002 | Tarantino | |
| 6,568,680 | B1 | 5/2003 | Moody et al. | |
| 6,585,587 | B2 * | 7/2003 | Falciglia, Sr. | 463/13 |
| 6,592,456 | B2 * | 7/2003 | Walker et al. | 463/13 |
| 6,652,377 | B1 * | 11/2003 | Moody | 463/13 |
| 7,022,016 | B2 * | 4/2006 | Wood et al. | 463/13 |
| 7,056,207 | B2 * | 6/2006 | Walker et al. | 463/13 |
| 2001/0023199 | A1 | 9/2001 | Walker et al. | |
| 2002/0034974 | A1 * | 3/2002 | Wood et al. | 463/13 |
| 2002/0082069 | A1 * | 6/2002 | Parker | 463/13 |
| 2002/0135128 | A1 * | 9/2002 | Tarantino | 273/292 |
| 2002/0187822 | A1 * | 12/2002 | Falciglia, Sr. | 463/13 |
| 2002/0198040 | A1 * | 12/2002 | Moody | 463/20 |
| 2003/0199294 | A1 * | 10/2003 | Walker et al. | 463/13 |
| 2004/0116170 | A1 * | 6/2004 | Walker et al. | 463/13 |

OTHER PUBLICATIONS

Website: "Hustler How-T0 for Lowball", (http //www hustlergaming com/lowNoFlush html), download date: Oct. 4, 2001.

Website: "Wireplay Poker", (http www wireplay com au/scripts/ Games asp?GameID2=56&I=2), download date: Oct. 4, 2001.

Website: "Pick'em Video Poker", Video Poker 1, (http // www videopoker1 com), copyright 2002.

Smolen, Don, "CPOKER". (http //conjelco com/software html), download date: Feb. 14, 2003.

Website "Rules of the Game—3.4 Splitting Pairs", (http // www blackjackinfo com/bjrules html), download date: Feb. 14, 2003.

Website: "Rules of the Game—3.1 Surrender", (http // www blackjackinfo com/bjrules html), download date: Feb. 14, 2003.

* cited by examiner

| OUTCOME | PAYOUT | | | | | DISCARD HAND BONUS |
|---|---|---|---|---|---|---|
| | 1 COIN WAGER | 2 COIN WAGER | 3 COIN WAGER | 4 COIN WAGER | 5 COIN WAGER | |
| ROYAL FLUSH | 250 | 500 | 750 | 1000 | 4000 | 200 |
| STRAIGHT FLUSH | 50 | 100 | 150 | 200 | 250 | 50 |
| FOUR OF A KIND | 25 | 50 | 75 | 100 | 125 | 25 |
| FULL HOUSE | 9 | 14 | 27 | 36 | 45 | 20 |
| FLUSH | 6 | 12 | 18 | 24 | 30 | 15 |
| STRAIGHT | 4 | 8 | 12 | 16 | 20 | 10 |
| THREE OF A KIND | 3 | 6 | 9 | 12 | 15 | 5 |
| TWO PAIR | 2 | 4 | 6 | 8 | 10 | 0 |

FIG. 3

METHOD AND SYSTEM FOR VIDEO POKER

PRIORITY CLAIM

The present application is a continuation application of, claims the benefit of and priority to U.S. patent application Ser. No. 11/412,438, filed on Apr. 27, 2006, which is a continuation application of, claims the benefit of and priority to U.S. patent application Ser. No. 10/619,066, filed on Jul. 14, 2003, which is a continuation-in-part application of, claims the benefit of and priority to U.S. patent application Ser. No. 09/858,987, filed on May 16, 2001, which is a continuation application of, claims the benefit of and priority to U.S. application Ser. No. 09/165,184, filed on Oct. 2, 1998, the entire contents of which are incorporated by reference herein.

FIELD

The present invention relates generally to gaming devices, and more particularly, to systems and methods for playing video poker.

BACKGROUND

Slot machines are highly profitable for casinos in the United States. In 1997, they accounted for more than $10 billion of total casino revenue. With individual slot machines typically earning between $50 and $150 per day, slot machines often account for well over one-half of the overall profits of most casinos. If past performance is any indication, interest in slot machines is growing. This can be attributed in large part to the development of electronic-type slot machines, such as those simulating various video poker games. Many players find video poker machines to be a more interesting alternative to traditional slot machines because they allow the player to make decisions throughout the game.

The earliest devised draw poker machines basically replicated a game of cards played at a table. More specifically, after placing a wager on a hand (i.e., inserting a predetermined number of coins) early video poker machines dealt playing cards from a standard fifty-two (52) card poker deck and displayed a single five (5) card hand to the player on a display screen. Thereafter, the player selected which of the five (5) playing cards he wanted to hold. Replacement cards were then dealt and displayed. Finally, the machine determined the player's winnings for the resulting five card hand based on a conventional poker hand ranking scheme.

BRIEF DESCRIPTION OF THE DRAWINGS

So that those having ordinary skill in the art to which the disclosed systems and methods pertain will more readily understand how to employ and use the same, reference may be had to the drawings wherein:

FIG. 3 is a sample of a payout schedule associated with the video poker gaming device of FIG. 2 and arranged in accordance with one or more embodiments of the present invention;

Figure 1:
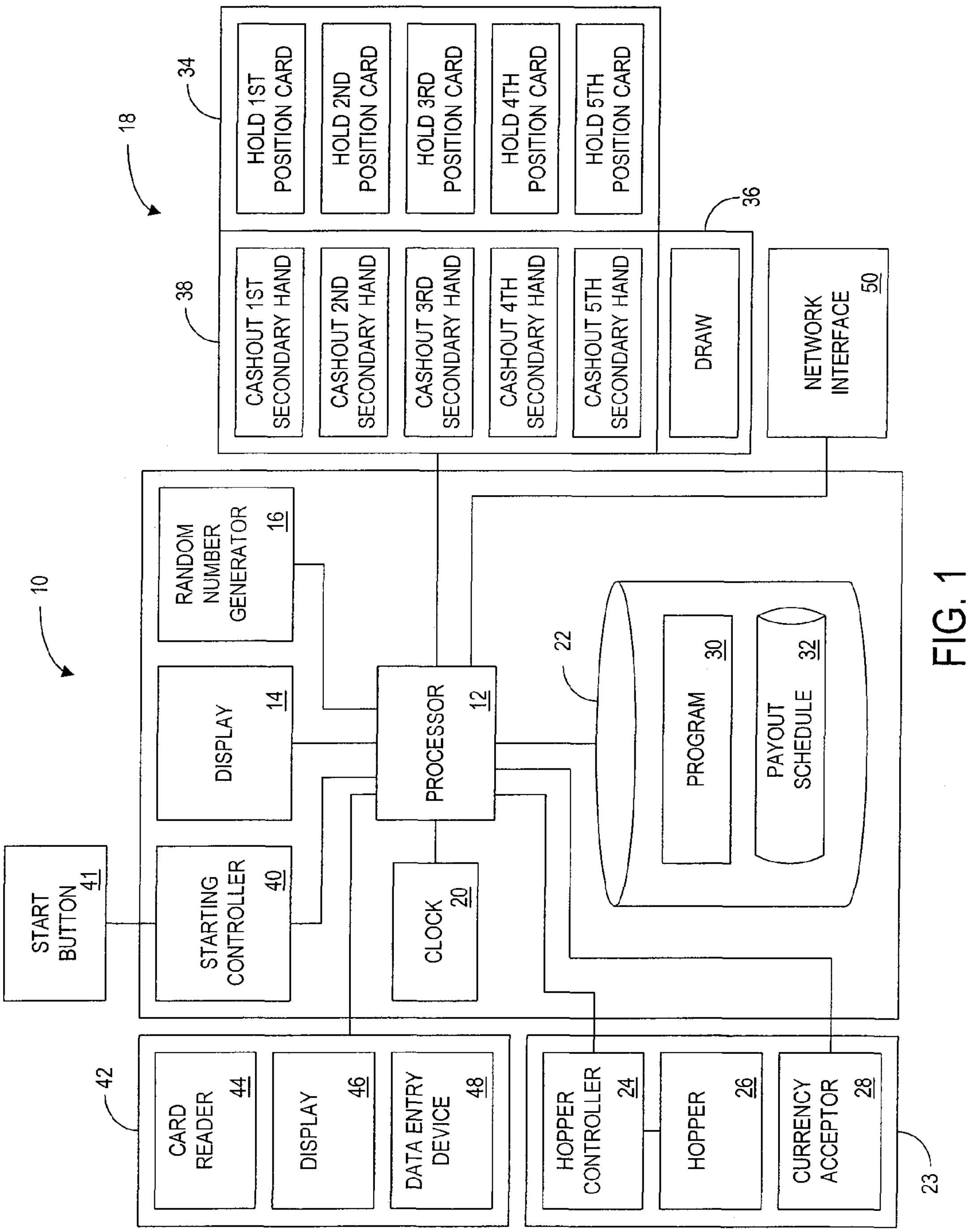
FIG. 1 is a schematic representation of a video poker gaming device configured in accordance with one or more embodiments of the present invention.

These and other features of the systems and methods disclosed herein will become more readily apparent to those having ordinary skill in the art from the following detailed description of the embodiments taken in conjunction with the drawings.

DETAILED DESCRIPTION

Various embodiments of the present invention provide for determining which cards from a primary poker hand are to be placed into a secondary poker hand and/or provide for determining how a determined card is to be placed in a secondary hand (e.g., in which secondary hand and/or in which position of the secondary hand). In some embodiments, the cards placed into a secondary poker hand may comprise cards discarded from a primary poker hand and/or may be cards that are held in the primary poker hand and also replicated in the secondary poker hand.

Applicants have recognized that some types of players would find it appealing to be further engaged during game play, as provided for in some embodiments of the present invention. Also, some types of players would find it appealing to benefit from more interesting and exciting playing action. For example, some types of players would find it appealing to be allowed to develop a variety of gaming strategies during play of games, such as video poker.

Applicants have also recognized that some types of operators of games, such as casinos, would find it appealing to be able to offer systems and methods that encourage players to play longer sessions, while at the same time maintaining acceptable payback percentages for the operators, as provided in accordance with one or more embodiments of the present invention.

Various embodiments of the present invention provide novel and unique systems and methods for playing video poker which serve to prolong gaming sessions, thereby increasing the profitability of an operator of video poker, such as a casino. Also, some embodiments of the present invention may encourage some types of players to deviate from traditional strategies for play, thereby increasing the excitement and interest of game play.

Various embodiments of the present invention are directed to novel and unique systems and methods for operating a video poker machine. Some embodiments of the present system and method are adapted and configured to enhance and prolong a gaming session, thereby improving the gambling experience as well as the profitability of the video poker machine.

According to one or more embodiments, a system includes a memory storage device adapted and configured to store a primary payout schedule associated with a primary poker hand and a secondary payout schedule associated with a secondary poker hand. The system further includes a processor in communication with the memory storage device which is adapted and configured to populate a primary poker hand with a plurality of playing cards, identify discard cards to be discarded from the populated primary poker hand, populate a secondary poker hand with the discard cards, and populate the primary poker hand to replace the discard cards discarded therefrom, thereby forming a final primary poker hand. In some embodiments of the present invention, the processor is adapted and configured to determine a payout based upon the playing cards in the final primary poker hand and the secondary poker hand utilizing the primary payout schedule and the secondary payout schedule, respectively.

According to one or more embodiments, a method of operating a video poker machine in accordance with the present invention includes the steps of populating a primary poker hand with a plurality of playing cards each having a respective card position, identifying discard cards to be discarded from the populated primary poker hand, populating a secondary poker hand associated with each card position with the playing cards discarded from such card position, populating the primary poker hand to replace the discard cards discarded therefrom so as to form a final primary poker hand, and determining a payout based at least upon the playing cards in the final primary poker hand. In addition, the method may include a step of determining a payout based upon the playing cards in at least one of the secondary poker hands.

According to some embodiments of the present invention, populating a secondary poker hand associated with each card position of the primary poker hand may comprise randomly populating a card position or only populating an unpopulated card position in such secondary poker hand. In some embodiments, a method may include a step of replacing a playing card in a secondary poker hand with a discarded playing card from a primary poker hand if a card position of the secondary poker hand is already filled with a playing card. Various embodiments of the present invention further include a step of determining a payout based upon the playing cards in at least one fully-populated secondary poker hand. Some embodiments of the present invention also include a step of receiving a request to analyze the playing cards in at least one of the secondary poker hands to determine a payout based thereupon.

These and other unique features of the systems and methods disclosed herein will become more readily apparent from the following description and the accompanying drawings.

Throughout the specification that follows, the term “video poker machine” includes, but is not limited to, the various programmable video-game apparatus including a video lottery terminal. In addition, the term “standard deck of playing cards” refers to a collection of fifty-two (52) cards comprising four (4) sets of cards identified by the characters 2 through 10, jack (“J”), queen (“Q”), king (“K”), and ace (“A”). Each of the four (4) sets of cards is differentiated by one of four (4) suits, namely, a spade (“s”), club (“c”), heart (“h”), or diamond (“d”). One or more jokers may also be included for use as the highest card or as a wild card. Reference to a deck of playing cards, unless specified otherwise, shall include one or more decks of playing cards. One or more decks can also be used in a single game. An “infinite” deck of playing cards refers to a deck wherein any single playing card can be dealt a repeated number of times.

Also throughout the specification, the term “primary poker hand” shall refer to a collection of cards that receive playing cards directly from a standard deck of playing cards. A card is discarded and becomes a “discard card” when a game player decides not to retain or “hold” the card in the primary poker hand. According to various embodiments of the present invention, discard cards are not eliminated from the game, but instead create one or more “secondary poker hands.” In such embodiments, a secondary poker hand may include one or more discard cards. In one embodiment, discard cards can replace cards previously placed into a secondary poker hand. Cards that are replaced in a secondary poker hand may either be eliminated from the poker game or create one or more third, or “tertiary,” poker hands. Each tertiary poker hand includes one or more replaced cards from a secondary poker hand. Additional poker hands, e.g., a fourth group of playing cards that are collected from the tertiary poker hand(s), may be created in a similar manner.

Various alternate embodiments that are within the spirit and scope of the present invention are possible. For example, the cards discarded from the primary poker hand by the player may not necessarily be placed into a secondary poker hand. Rather, they may be discarded in the conventional manner by simply being replaced in the primary poker hand without at all contributing to any of the secondary poker hands. Alternatively, a discard card may knock out a whole secondary poker hand, rather than a single card of the secondary poker hand.

The process of adding cards to a poker hand is described herein as “populating” the poker hand, and poker hands having had playing cards added to them are said to have been “populated.” For example, a primary poker hand is populated when the hand receives playing cards from the standard deck of playing cards. Also, for example, a secondary poker hand is populated when it receives a discard card from the primary poker hand.

Referring now to the drawings wherein like reference numerals identify similar elements of the present invention, there is illustrated in FIG. 1 a video poker system 10 in the form of a slot machine constructed in accordance with an embodiment of the present invention. Video poker system 10 includes a processor 12 which may comprise one or more commercially available microprocessors, such as INTEL CORPORATION’s (Santa Clara, Calif.) PENTIUM® microprocessor or the like. A video display 14 in the form of a cathode ray tube (CRT), liquid crystal display (LCD), or light emitting diode (LED) display is operably connected to processor 12, along with a random number generator 16, player controls 18, a clock 20, and a data storage device 22. In addition, a set of currency handling devices 23, a starting controller 40 to which is connected a start button 41, a player card interface 42, and a network interface 50 are operably connected to processor 12.

The random number generator 16 is adapted and configured to generate a random or a pseudo-random number to determine, for example, the random selection of cards to form a playing card hand or the position of a playing card within a hand. These aspects will be more fully described hereinbelow. Alternatively, random number generator 16 can be implemented in software and thus random numbers would be generated by the software controlling processor 12. The structure and operation of random number generator 16 is well known in the art.

The currency handling devices 23 include a currency acceptor 28 that is operably connected to processor 12 for signaling the processor upon receipt of currency such as coins, bills, or tokens from a player. Currency acceptor 28 may also be configured to accept forms of non-currency payment such as credit cards, debit cards, smart cards, or the like. A hopper controller 24 is adapted and configured to control the dispensing of money from a hopper 26, typically in the form of coins or tokens, to return change or disburse winnings to a player. The terms coins and tokens are used interchangeably throughout the specification and simply represent a monetary amount. It should be readily understood that a player’s winnings may take other forms as well, for example, as credits or points. The structure and operation of hopper controller 24, hopper 26, and currency acceptor 28 are well known in the art.

Data storage device 22 comprises at least one of a selected semiconductor, magnetic, or optical memory components as are well known in the art. The data storage device 22 contains at least a program 30 providing instructions for the operation of processor 12 and a payout schedule 32 for providing an appropriate payout corresponding to the outcome of a particular card game. Player controls 18 and start button 41 are utilized to play a video poker game, to be described in greater detail hereinbelow, by a game player during operation of video poker system 10. Player card interface 42 enables a game player to save and reload information related to the player.

Player controls 18 include primary card hold controls 34, a card draw control 36, and secondary poker hand cashout control buttons 38 each of which are operably connected to processor 12. Each control 34, 36, and 38 is accessible to a player during game participation for furthering game play or altering game strategies as will be described further hereinbelow. Although five (5) primary card hold controls 34 and five (5) secondary poker hand cashout control buttons 38 are shown, an embodiment of the present invention may include more or fewer of each control type.

The starting controller 40 is provided for sending a signal to processor 12 indicating that video poker system 10 has been enabled for play, as is well known in the art. A game player activates starting controller 40 by actuating start button 41. Player card interface 42 is operably associated with processor 12 and includes a card reader 44 for reading a player tracking card (not shown). Player tracking cards of this type may comprise magnetic storage media or optical storage media as is well known in the art. Each player tracking card may include a code stored thereon that identifies the player for various purposes. For example, such purposes may include a code to restart a playing session where a player earlier left off, to credit bonus points to the player during off-peak playing hours, or to credit bonus points for having played for a predetermined amount of time. Such bonus points may subsequently be exchanged for casino merchandise or services, as is well known in the art.

Player card interface 42 further includes a display 46 for providing information to the player and an associated data entry device 48 for enabling a player to communicate with system 10. Display 46 may be in the form of an LCD or LED device and can be used to display bonus information or other targeted messages to a player. Data entry device 48 may be in the form of a numeric keypad, touch screen, or other similar input device. Network interface 50 is operably connected to processor 12 and preferably comprises a communication port or card for enabling communication between multiple video poker systems 10 and a server as will be discussed hereinbelow.

Figure 2:
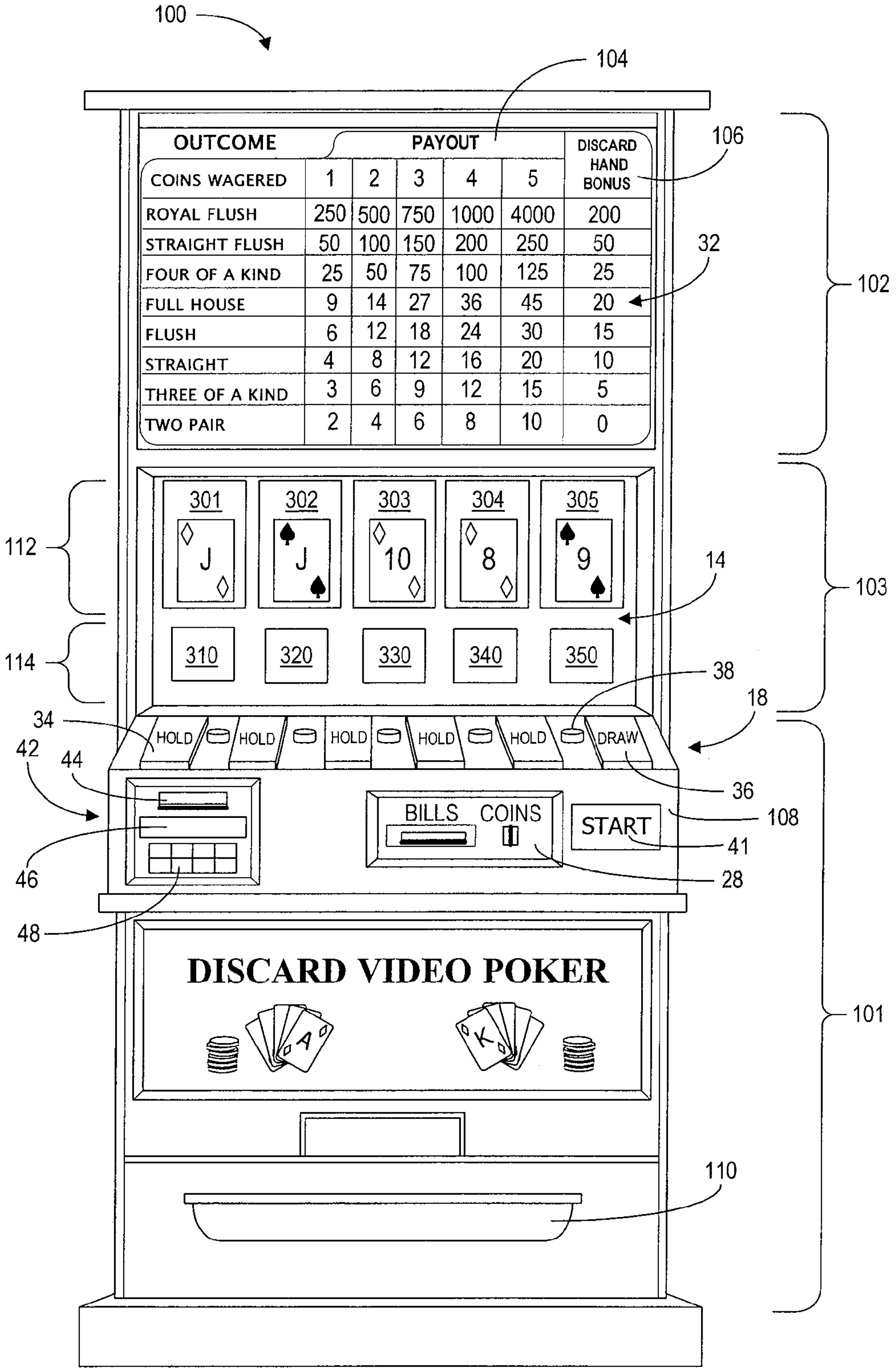
FIG. 2 is a front elevational view of a video poker gaming device configured in accordance with one or more embodiments of the present invention.

Referring now to FIG. 2, a video poker machine 100 is illustrated comprising the components illustrated in FIG. 1 and described hereinabove. A lower panel 101 of video poker machine 100 supports player controls 18. Below player controls 18 is a front panel 108 supporting player card interface 42, currency acceptor 28, and start button 41. A coin tray 110 is provided below front panel 108 for collecting coins or tokens dispensed from hopper 26.

An upper panel 102 of video poker machine 100 displays the contents of payout schedule 32 which includes a primary poker hand payout schedule 104 (entitled "payout") and a secondary poker hand payout schedule 106 (entitled "discard hand bonus") as illustrated. As noted above, payout schedule 32 is stored in data storage device 22.

Referring to FIG. 3, payout schedule 32 includes a column depicting winning-hand combinations, or "outcomes" (e.g., royal flush, straight flush, four of a kind, etc.), and corresponding payouts for achieving the outcomes. The size of the payout depends on the number of coins wagered as is currently implemented in existing video poker games.

To illustrate payout schedule 32, a player inserting the minimum wager of one (1) coin and ultimately obtaining two pair in his primary poker hand and two pair in one of his secondary poker hands will receive a total payout of two (2) coins (2+0=2 coins). As another example, a player who wagers three (3) coins and obtains a full house in his primary poker hand and a straight flush in one of his secondary poker hands will receive a total payout of seventy-seven (77) coins (27+50=77 coins). In another embodiment, the player may not be eligible to receive a payout for a secondary poker hand unless he had wagered the maximum number of coins on the primary poker hand. Payout schedule 32, for example, has a maximum wager of five coins. In yet another embodiment, the amount of the discard hand bonus for any of the secondary poker hands may vary as a function of the number of coins wagered in a similar manner to that illustrated by the payouts for the primary poker hand in payout schedule 32. The method of game play, method by which primary and secondary poker hands are developed, and payout variations related thereto will be described and discussed in detail hereinbelow.

Referring again to FIG. 2, a center panel 103 of video poker machine 100 includes display 14 which includes an image as shown thereon. The upper portion of display 14 includes a graphical representation of a primary poker hand 112 having five (5) card positions, 301 through 305. The lower portion of display 14 includes five (5) secondary poker hands 114 identified as 310 through 350. Each secondary poker hand 310 through 350 is associated with a card position of primary poker hand 112. For example, secondary poker hand 310 is associated with card position 301 and secondary poker hand 320 is associated with card position 302 of primary poker hand 112.

In an alternate embodiment of the present invention the secondary poker hands 112 are not associated with any particular card position of primary poker hand 112. Another embodiment of the present invention comprises a primary poker hand 112 having more or less than five (5) card positions and an associated secondary poker hand for each card position. Yet another embodiment comprises a primary poker hand 112 having more or less secondary poker hands 114 associated with each card position of primary poker hand 112. For example, a primary poker hand 112 may have five (5) card positions and one (1) secondary poker hand associated with the primary poker hand 112.

In another alternate embodiment, the player may choose which of the possible secondary poker hands, or which position at a particular secondary poker hand, any given discard card will be placed into. For example, the player may indicate a card to be discarded (e.g., by touching the representation of the card on a touch screen) and then may indicate a particular secondary poker hand (e.g., by touching a location corresponding to the secondary poker hand), a particular position (e.g., by inputting a number on a keypad), or a particular position within a particular secondary poker hand (e.g., by touching the particular position in a displayed secondary poker hand). The selection of the secondary poker hand and/or the secondary poker hand position could occur before the deal of the primary poker hand and/or before indicating a particular discard card. Thus, a player might indicate that he wants to "fill in" the final card of a five card secondary hand with the next available discard card.

According to some embodiments of the present invention, the placement of discarded cards in secondary hands may be determined based on one or more rules. Rules may be established by an operator of a video poker game, by a manufacturer of a video poker gaming device, and/or by a player. For example, a casino may establish a rule that discarded cards will be placed in one or more secondary poker hands so as to create the best possible secondary poker hand(s) for the player. For instance, the video poker machine may determine the position and/or secondary hand that corresponds to the highest expected value for the player, based on the discarded card and/or any cards already placed in the secondary hand(s). Alternatively, the position may be determined by the highest possible payout for the player. In another example, the casino might establish that possible flush secondary hands are to be filled before possible straight secondary hands.

In another rule embodiment, a rule may be based on a player preference. For example, a player may establish a preference that discarded cards are to be placed within one or more secondary poker hands based on the card's suit. For instance, a player may prefer that any discarded Hearts are placed in one hand and any discarded Diamonds are placed in another hand, or may prefer that within a secondary poker hand the cards are positioned (and re-positioned, if necessary) so that like-suited cards are next to one another. Player preferences could also indicate an expected time frame over which the player expects to conduct a gaming session. The video poker machine could distribute discarded cards into a plurality of secondary hands based on this information. For example, the video poker machine could fill a first secondary hand before filling other secondary hands if the player expects to be playing for only a short period of time, thus maximizing the chances of a bonus payout to the player before the gaming session is completed. For a longer expected time frame for a session, the video poker machine could allocate cards among the secondary hands so as to better maximize potential payouts to the player. As will be readily understood by those skilled in the art, player preferences may be stored in a database, for example, in association with a player tracking card.

According to some embodiments, a rule for placement of a discarded card may be based on one or more predetermined card positions of the secondary poker hand(s). For example, a card position of a secondary poker hand may be associated with a particular card, and only that card, if discarded, may be placed in that predetermined position. A predetermined card position of a secondary poker hand may be indicated by a grayed-out representation of the particular card, or otherwise represented so as to indicate that the position is associated with the particular card but the card has not yet been used to populate that position. In some embodiments, all of the secondary poker hand card positions are associated with predetermined cards. Thus, if a discarded card does not correspond to any predetermined position, the discarded card may be removed from play in a conventional manner. Predetermined card positions are discussed further herein with respect to FIGS. 23A and 23B.

In one or more embodiments of the present invention, a player may be able to select which secondary poker hand positions are to be associated with cards and/or may be able to select one or more cards to associate with a predetermined card position. A predetermined card position may be associated with one or more specific cards (e.g., a specific rank and value, such as Jh), one or more card ranks (e.g., Hearts; Clubs and Spades), and/or one or more card values (e.g., 7s; face cards).

Referring again to FIG. 2, card positions 301 through 305 of primary poker hand 112 are populated by video poker system 10 in any number of ways. For example, each card position 301 through 305 may be populated from a single deck of cards, from five (5) decks of cards that are each dedicated to feeding a different card position, or from an infinite deck of playing cards. Of course, a card having a particular character and suit may turn up several times when more than one deck or when an infinite deck of cards is used. Cards are dealt or distributed under the control of processor 12 and random number generator 16.

An example of a playing session follows to better illustrate a method of playing one or more embodiments of the present invention and, in addition, to demonstrate a number of variations. This example is not meant to limit the way in which this game is played, but only to exemplify some of the basic concepts of the invention. As will become apparent to one skilled in the art, there are a multitude of variations that can be made from the basic concepts described and claimed herein.

Figure 4:
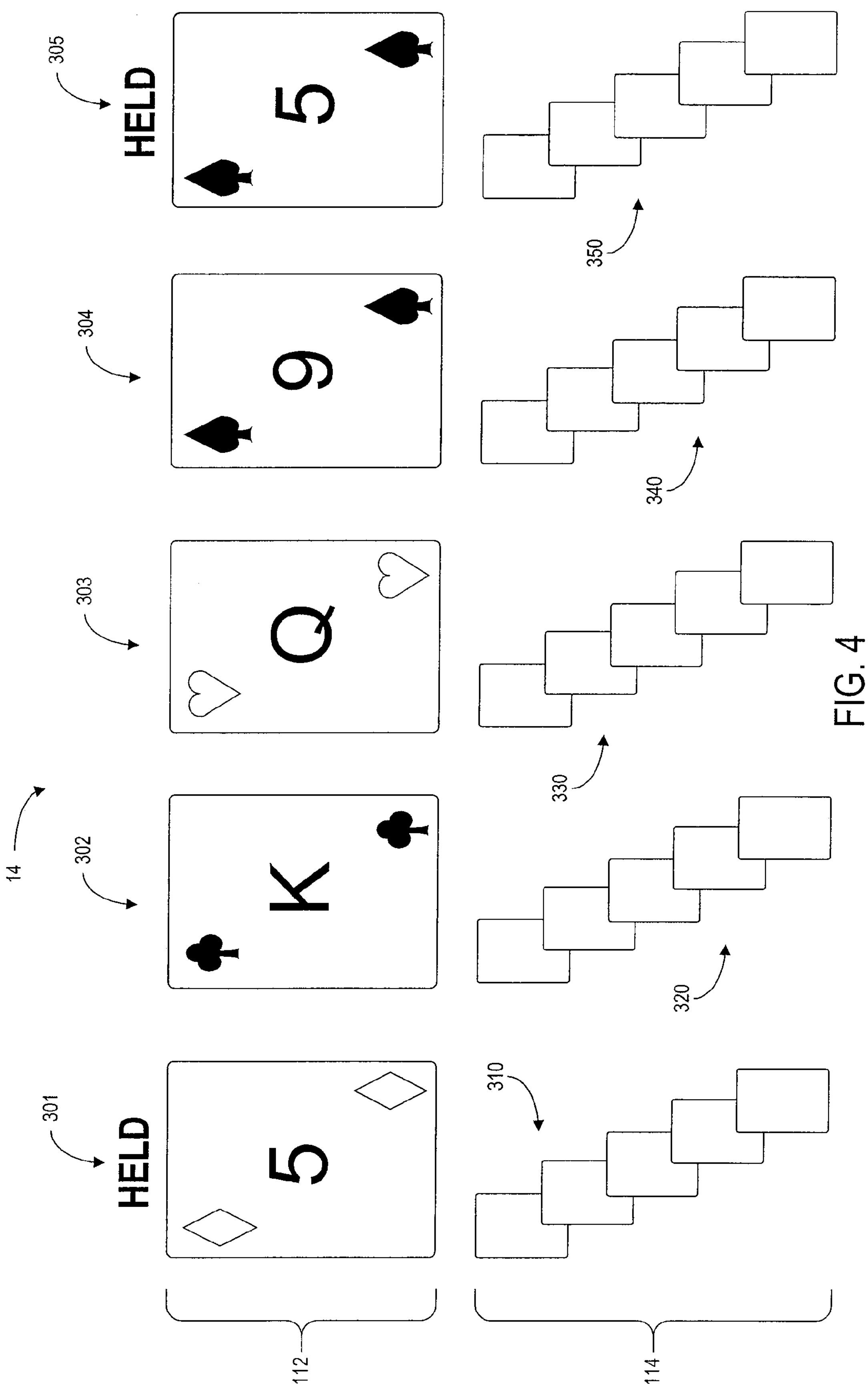
FIGS. 4-19 are successive exemplary views of the video display of the video poker gaming device of FIG. 2 during a gaming session in accordance with one or more embodiments of the present invention.

Referring now to FIGS. 2 and 4, an embodiment of the present invention operates generally as follows. The embodiment described comprises a primary poker hand 112 of five (5) card positions, 301 through 305, and secondary poker hands 114, identified as 310 through 350, for each of the five (5) primary poker hand card positions, 301 through 305. Each secondary poker hand consists of five (5) cards. In addition, each card that is not held (i.e., retained) in primary poker hand 112 is discarded into the secondary poker hand associated therewith. Thus, each of the discard cards populate the secondary poker hands with which they are associated.

In the embodiment that follows, discard cards are randomly discarded from the primary poker hand 112 to the secondary poker hand 114 associated therewith to either fill an empty card position or replace a playing card that already fills a card position. In an alternate embodiment, discard cards are discarded either randomly or sequentially into empty secondary poker hand card positions until all of the empty card positions are filled. Once the secondary poker hand is filled, the discard cards are either randomly or sequentially discarded into the filled secondary poker hand 114. Other various discard combinations including, for example, the above-described random and sequential discard techniques, are envisioned. Those cards in the secondary poker hand that are replaced are either eliminated from the game or, as described above, fill additional poker hands (e.g., a tertiary poker hand).

As discussed herein, some embodiments of the present invention provide for placing discarded cards into the secondary poker hands in various additional or alternative ways. For example, the discarded cards may be arranged according to various types of stored rules, predetermined card positions, player preferences, or any combination of the techniques described herein.

A player activates machine 100 by, for example, feeding bills, coins, or tokens into currency acceptor 28 and actuating start button 41. In the alternative, a player inserts a player tracking card into card reader 44 to register "credits" received either from an earlier game playing session or from a card crediting device (not shown). Such "credits" may be stored on a casino server in association with the code that identifies the player. The machine 100 may read the code off of the player tracking card and retrieve the associated credits from the casino server via network interface 50. Using, for example, data entry device 48, the player may indicate prior to each new primary poker hand 112 being dealt the number of coins that are to be wagered.

Initially, primary poker hand card positions 301 through 305 and secondary poker hands 310 through 350 are void of playing cards. The player presses draw control button 36 signaling processor 12 to deal a hand of cards to card positions 301 through 305 of primary poker hand 112.

After pressing draw control button 36, an initial hand is dealt populating all five (5) card positions of primary poker hand 112. As illustrated in FIG. 4, the primary poker hand 112 includes 5d, Kc, Qh, 9s, and 5s. As is conventional in the art of five card draw poker, the player determines which cards are to be held and, thereby, which are to be discarded. This decision is conveyed to video poker machine 100 by the player pressing the hold control buttons 34 that are associated with each card that is to be held in the primary poker hand 112. In this example, the player holds the 5d and 5s in card positions 301 and 305, respectively. The Kc, Qh, and 9s in card positions 302, 303, and 304, respectively, are discarded.

Figure 5:
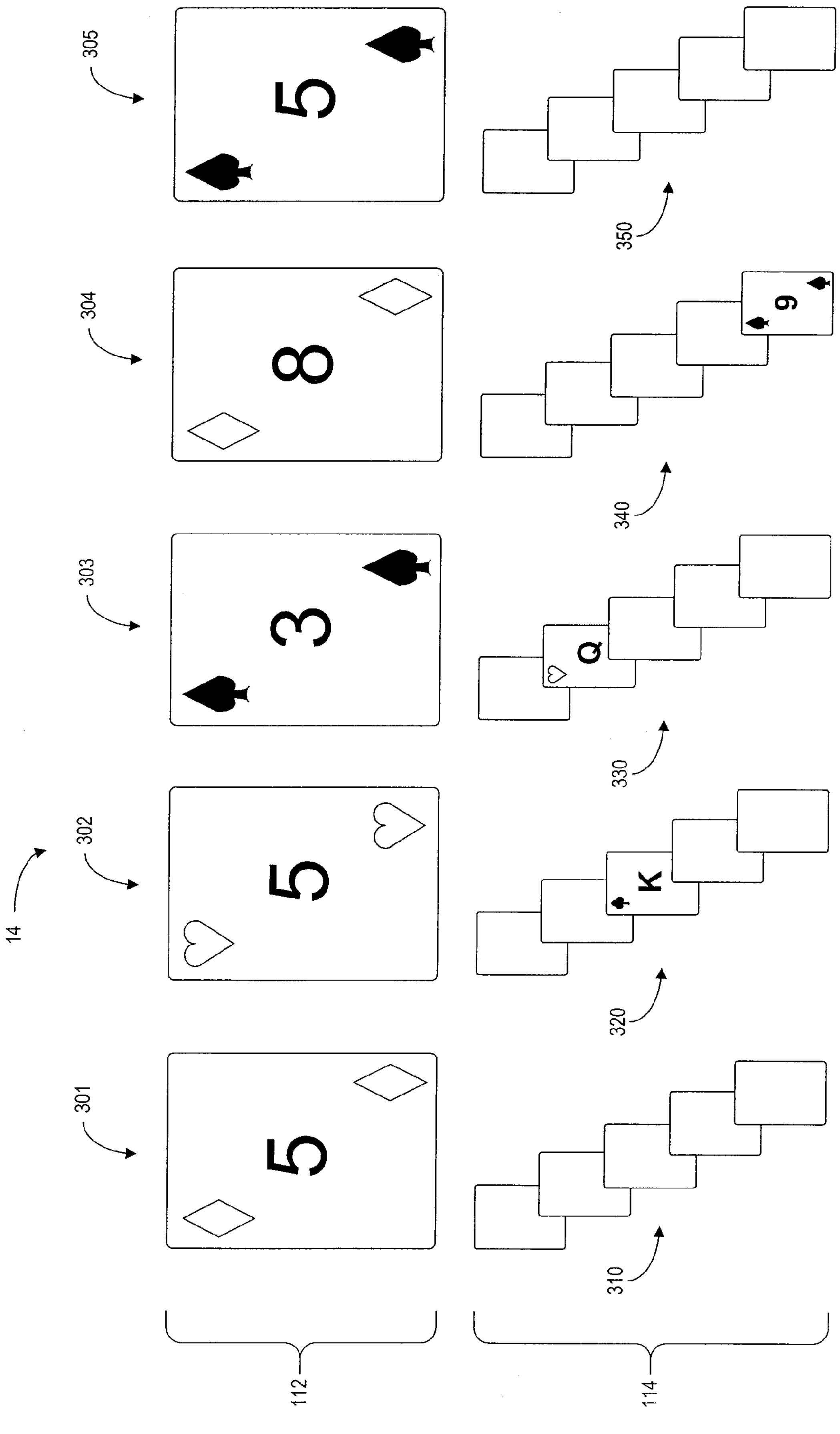

Referring to FIG. 5, upon pressing draw control button 36, the Kc, Qs, and 9s are discarded into random positions of secondary poker hands 320, 330 and 340, respectively. Of course, an alternate embodiment contemplates that the cards may be discarded into sequential positions of the secondary poker hands. In yet another alternate embodiment, cards discarded from the primary poker hand do not fill the secondary poker hand unless the player has wagered the maximum number of coins.

Primary poker hand 112 is again populated, replacing the cards that were discarded therefrom with the 5h, 3s, and 8d in card positions 302, 303, and 304, respectively. The primary poker hand 112 is completed, and therefore, a payout for primary poker hand 112 and any completed secondary poker hands 114 is determined using payout schedule 32.

In this example, the payout is calculated for three of a kind in the primary poker hand 112 which amounts to, for example, nine (9) coins if three (3) coins were wagered. To continue play, the player activates machine 100, for example, by actuating start button 41, and actuates draw control button 36 signaling processor 12 to deal a new hand of cards to primary poker hand 112. The cards in secondary poker hands 320, 330, and 340 remain.

Figure 6:
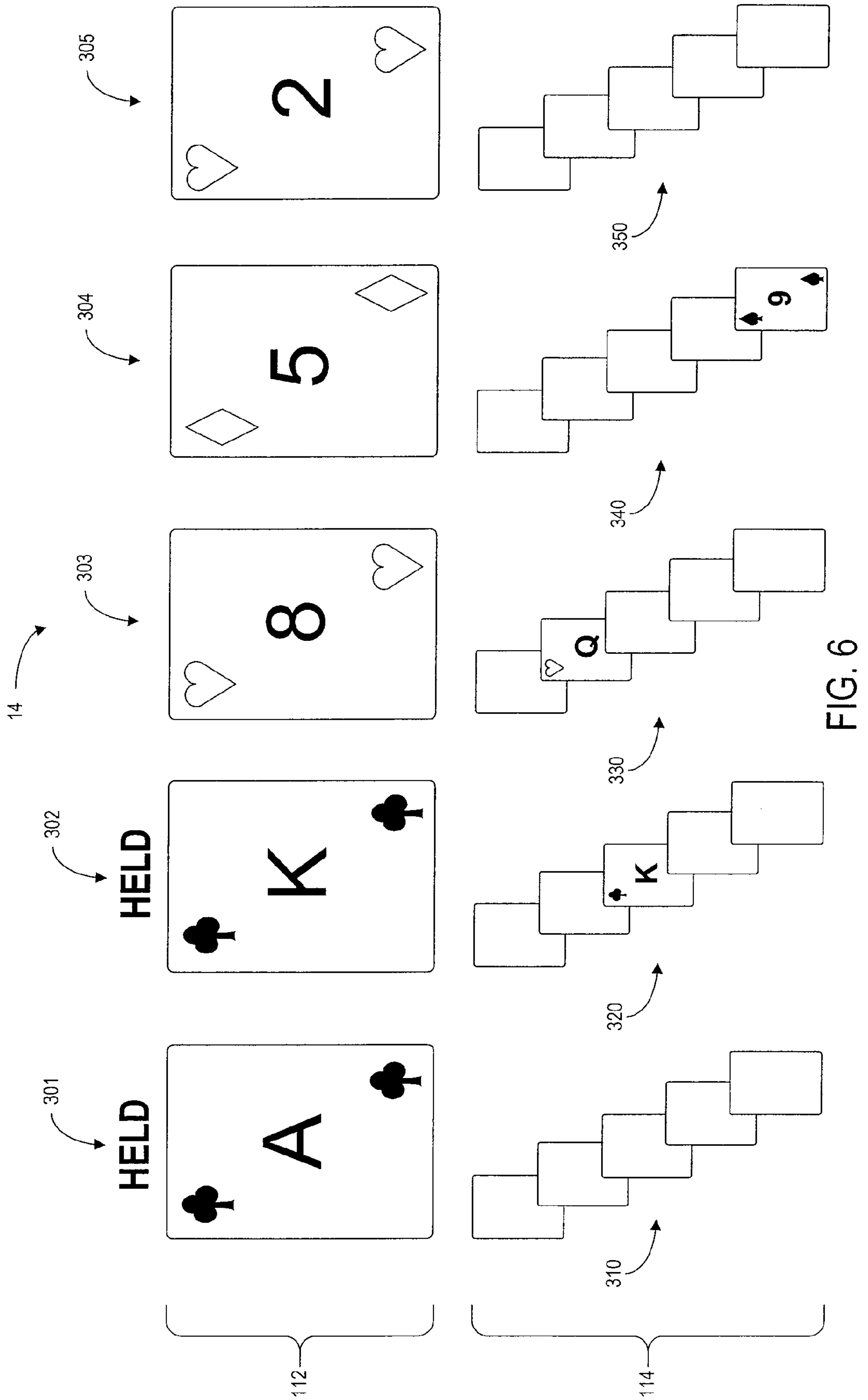

FIG. 6 shows a new primary poker hand 112. In this example, the player decides to hold the Ac and Kc in card positions 301 and 302, respectively, of primary poker hand 112. Thus, the player indicates that the 8h, 5d, and 2h in card positions 303, 304, and 305, respectively, are to be discarded by actuating the appropriate hold control buttons 34.

Figure 7:
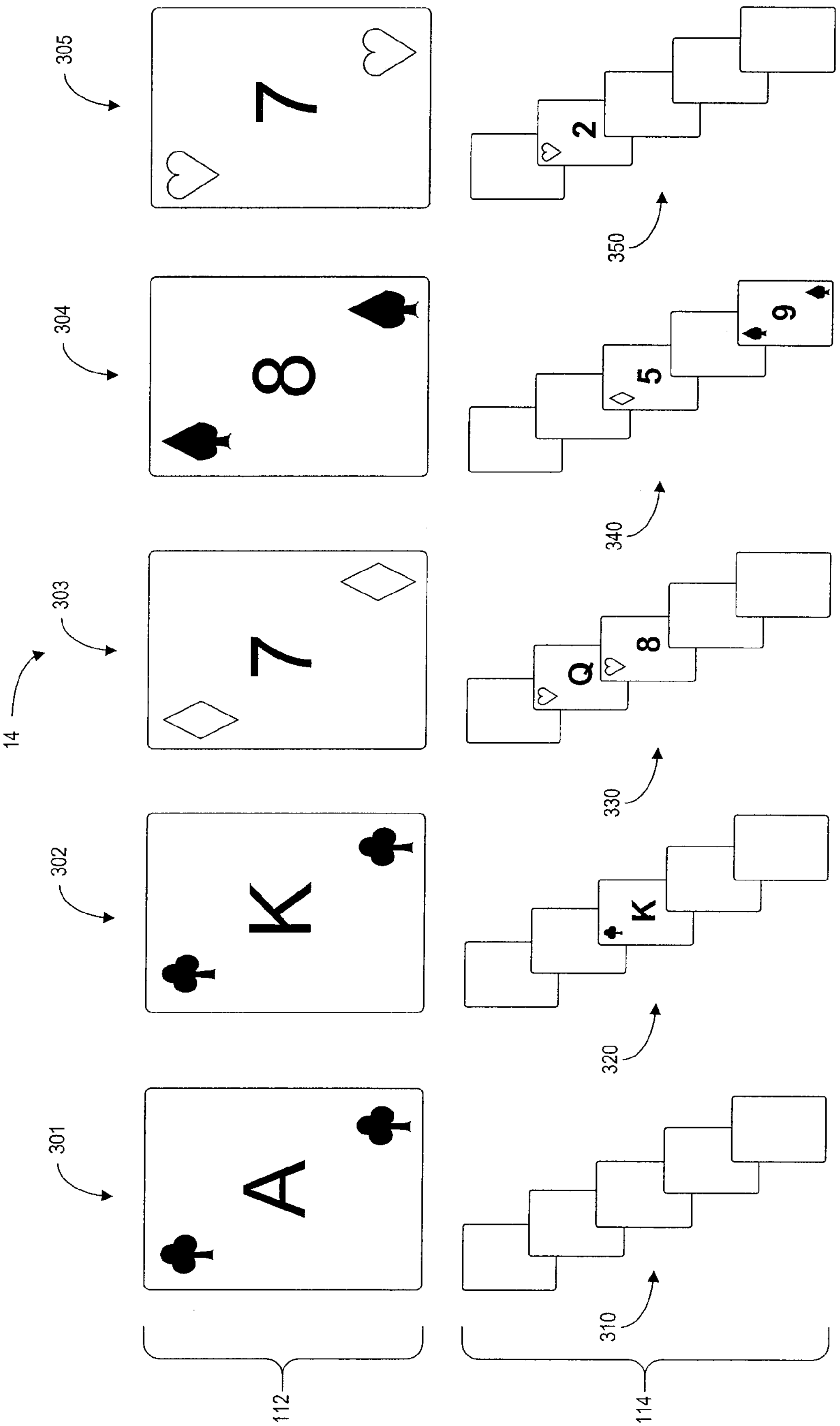

Referring to FIG. 7, upon actuating draw control button 36, the 8h, 5d, and 2h are discarded into random positions of secondary poker hands 330, 340, and 350, respectively. Primary poker hand 112 is again populated, replacing the cards that were discarded with the 7d, 8s, and 7h in card positions 303, 304, and 305, respectively. The primary poker hand 112 is completed, and therefore, a payout for the primary poker hand 112 and any completed secondary poker hands 114 is determined. In this example, there is no payout because the final primary poker hand 112 does not match any of the designated "outcomes" in payout schedule 32 (i.e., two pair or better are required for a payout) and none of the secondary poker hands 114 are complete. To continue play, the player activates machine 100 and presses draw control 36 signaling processor 12 to deal a new hand of cards to primary poker hand 112.

Figure 8:
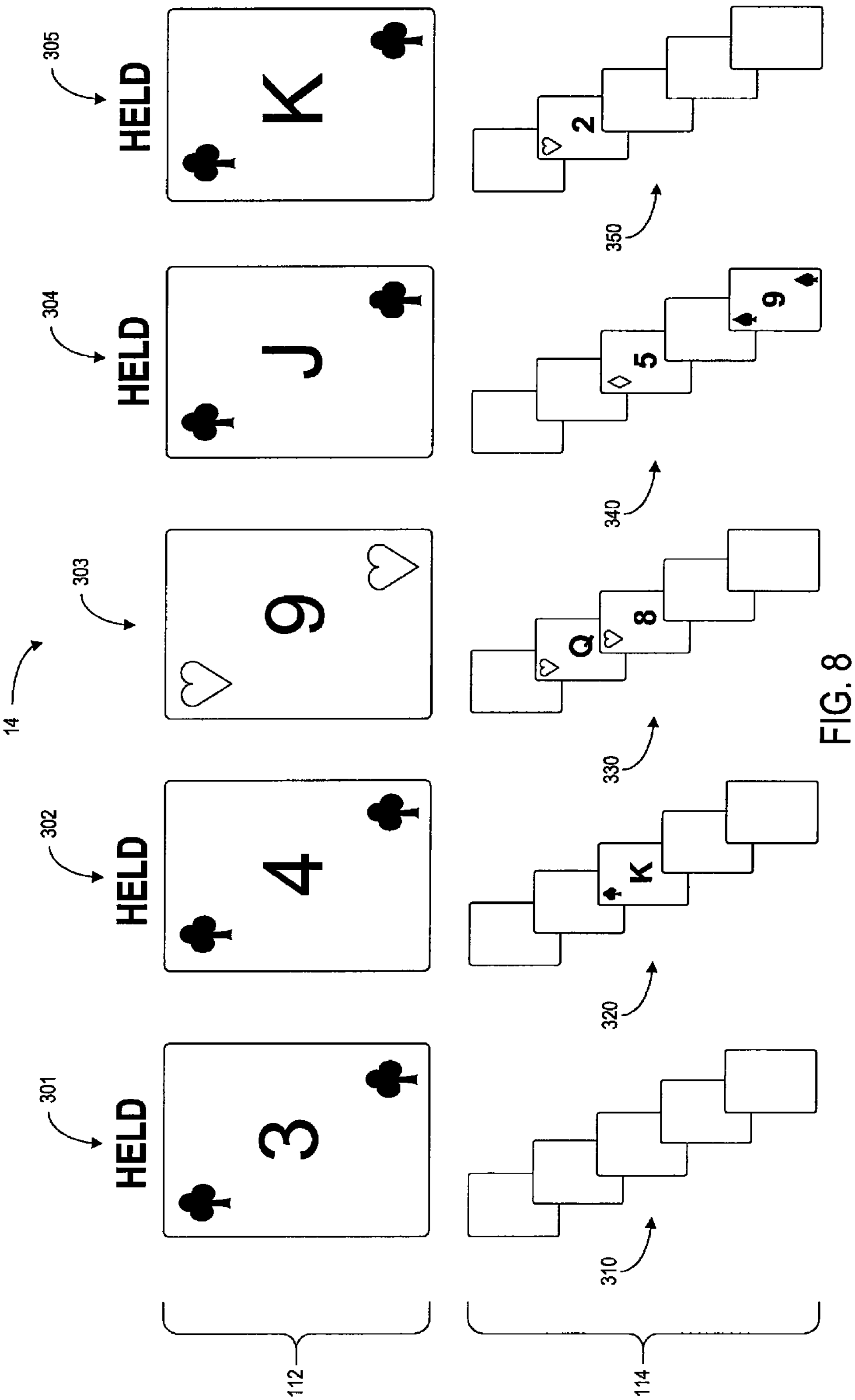
Figure 9:
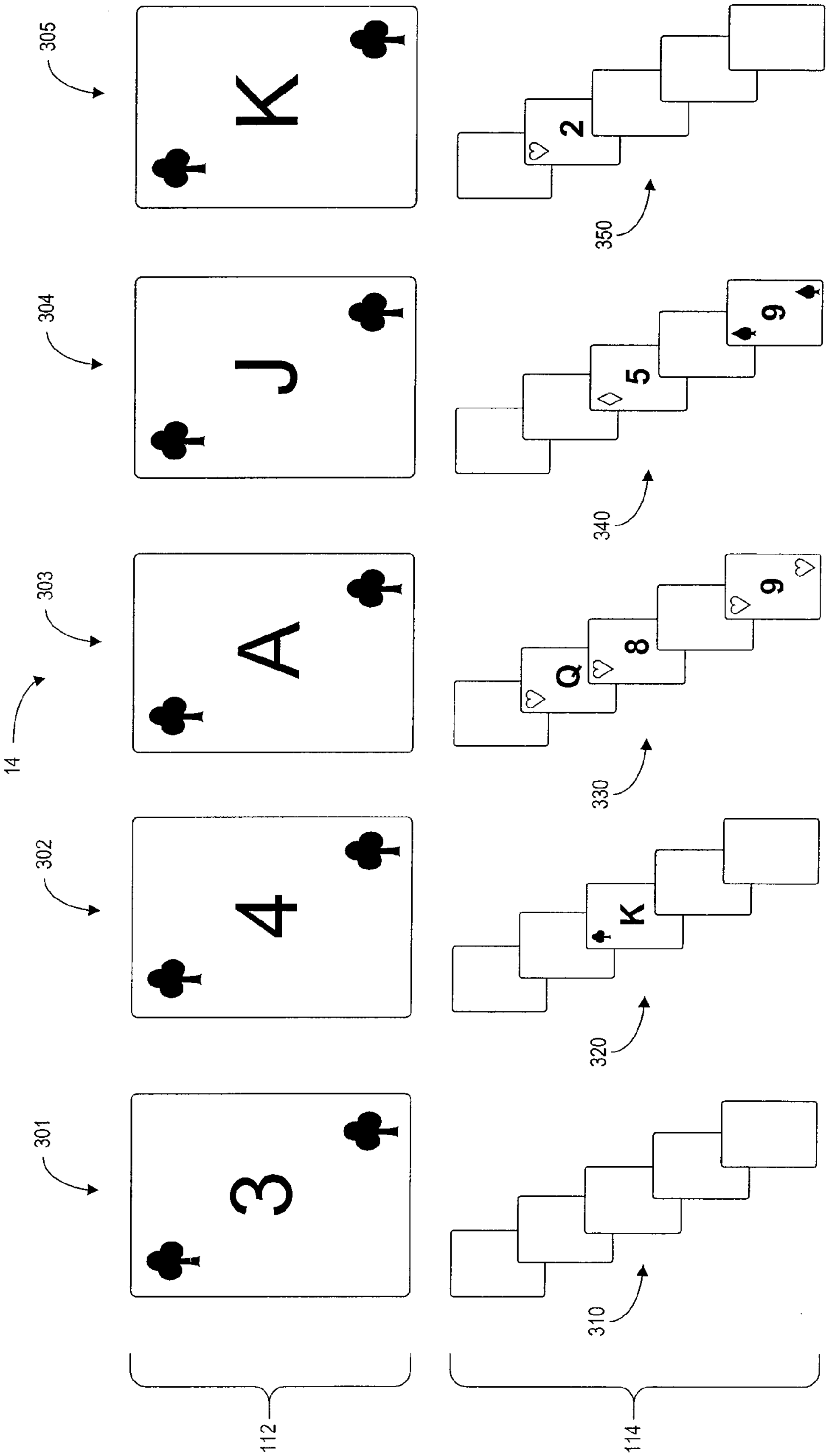

Referring to FIG. 8, the new primary poker hand 112 is shown, in which the player decides to hold the 3c, 4c, Jc, and Kc in card positions 301, 302, 304, and 305, respectively. Thus, the 9h in card position 303 is to be discarded. FIG. 9 shows that after the appropriate hold control buttons 34 are actuated, and upon actuating draw control button 36, the 9h is discarded into a random position of secondary poker hand 330. Primary poker hand 112 is again populated, replacing the card that was discarded therefrom with the Ac in card position 303. The primary poker hand 112 is completed, and therefore, a payout for the primary poker hand 112 and any completed secondary poker hands 114 is determined. The payout for the flush in the primary poker hand 112 amounts to, for example, eighteen (18) coins if three (3) coins were wagered. There is no payout for the secondary poker hands 114. To continue play, the player activates machine 100 and actuates draw control button 36 signaling processor 12 to deal a new hand of cards to primary poker hand 112.

Figure 10:
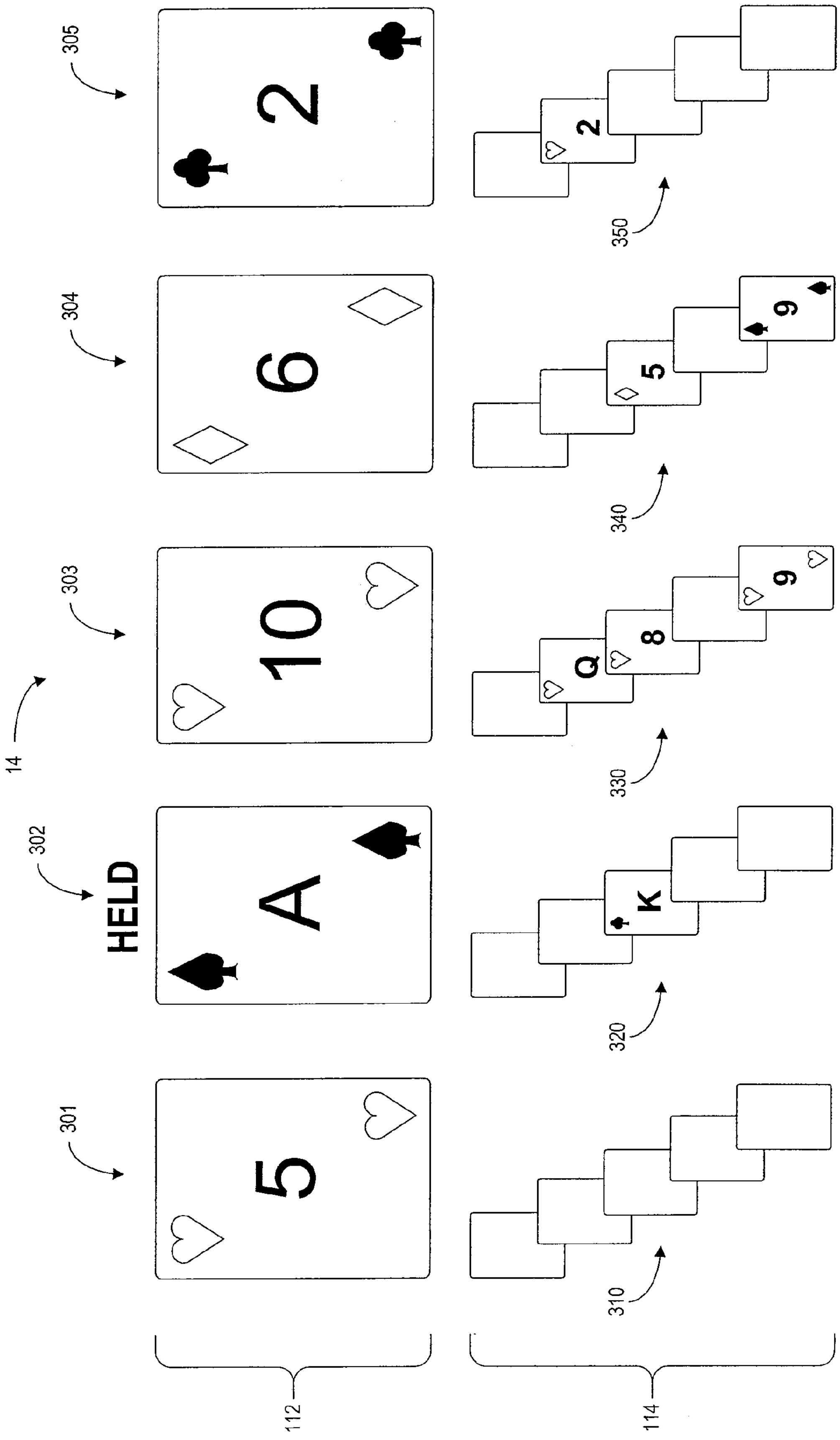
Figure 11:
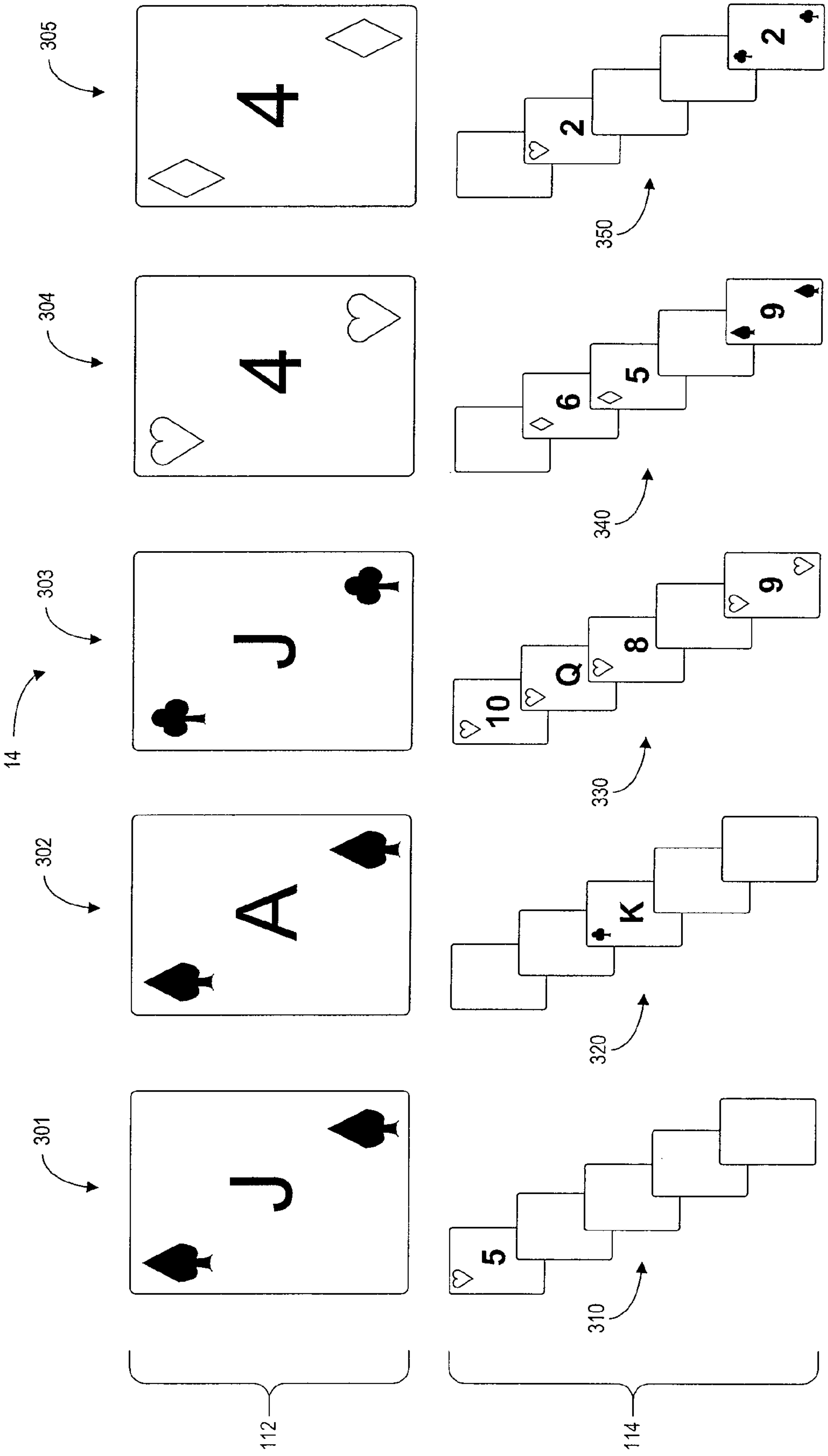

Referring to FIG. 10, the new primary poker hand 112 is shown, in which the player determines that it is best to hold the As in card position 302. Thus, the 5h, 10h, 6d, and 2c in card positions 301, 303, 304, and 305 are to be discarded to the secondary poker hands. Referring to FIG. 11, after determining which cards to hold and actuating the appropriate hold control buttons 34, the player actuates draw control button 36, and the 5h, 10h, 6d, and 2c are discarded into random card positions of secondary poker hands 310, 330, 340, and 350, respectively. Primary poker hand 112 is again populated, thereby replacing the cards that were discarded therefrom with the Js, Jc, 4h, and 4d in card position 301, 303, 304, and 305, respectively. The primary poker hand 112 is completed, and therefore, a payout for the primary poker hand 112 and any completed secondary poker hands 114 is determined. The payout is for two pair in the primary poker hand 112, which amounts to six (6) coins if three (3) coins were wagered. No winning outcomes were achieved in any of the secondary poker hands 114. To continue play, the player activates machine 100 and actuates draw control button 36.

Figure 12:
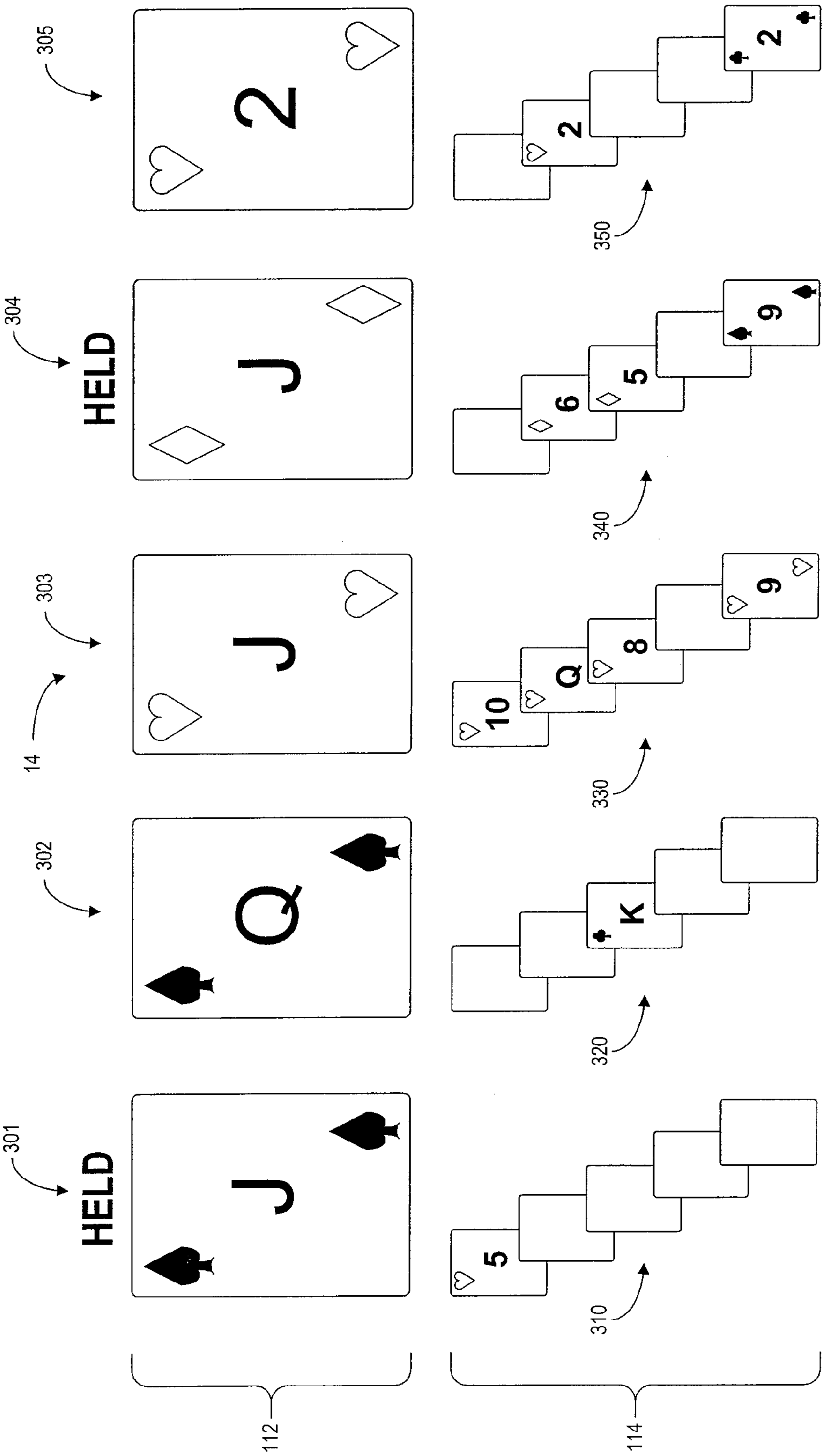

Referring to FIG. 12, a new primary poker hand 112 is dealt. In this example, the player has drawn three of a kind, i.e., Js, Jh, and Jd in card positions 301, 303, and 304, respectively. Ordinarily, the player would hold all three cards to earn a guaranteed payoff, e.g., nine (9) coins if three (3) coins were wagered.

However, there is a possibility that the Jh, if discarded, will drop into the empty position of secondary poker hand 330 resulting in a straight flush which has a higher payoff, i.e., fifty (50) coins. In this example, the player takes this chance by actuating the appropriate hold control buttons 34 in order to hold only the Js and Jd in card positions 301 and 304, respectively. Thus, the Qs, Jh, and 2h in card positions 302, 303, and 305, respectively, are to be discarded.

Figure 13:
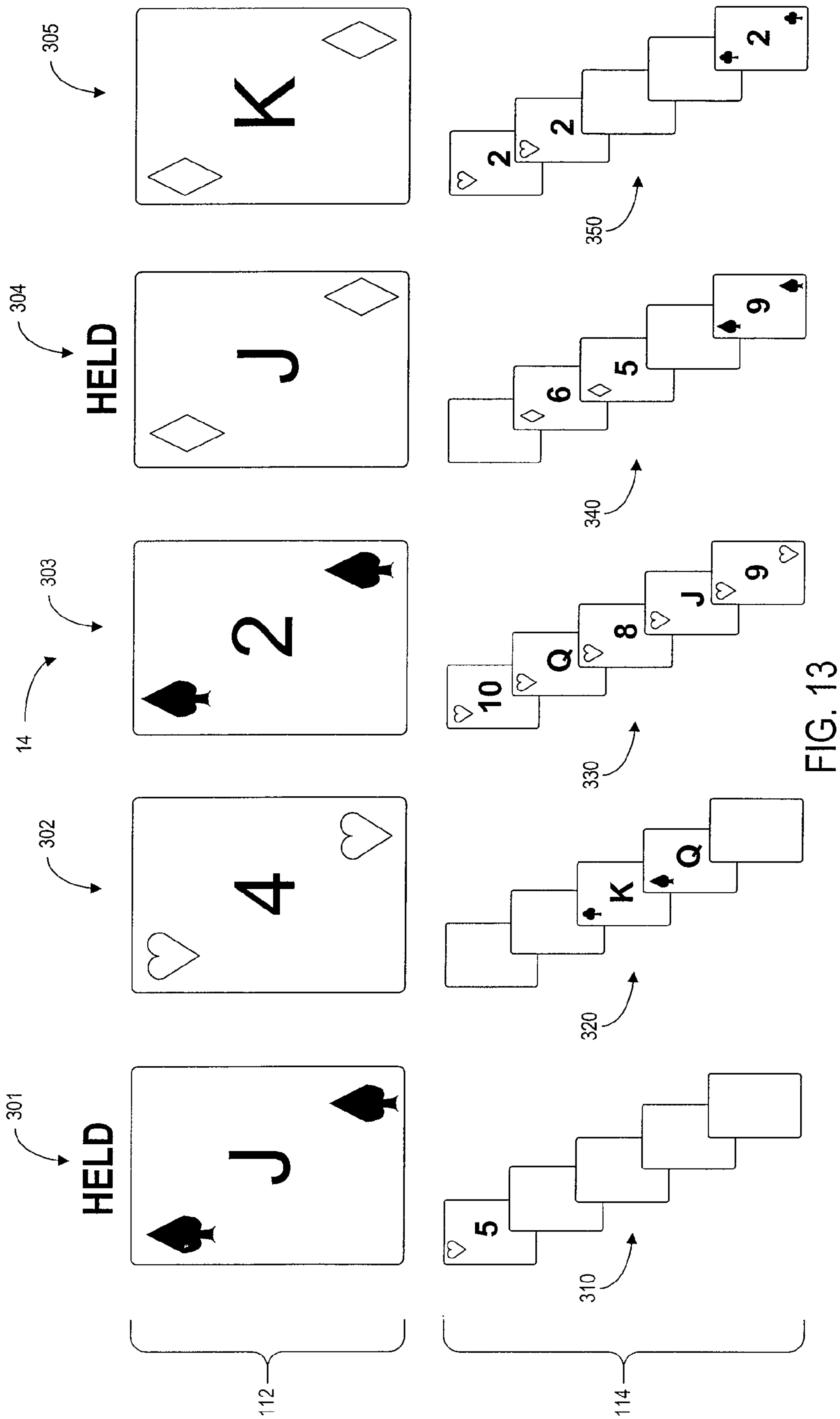

Referring to FIG. 13, upon actuating draw control button 36, the Qs, Js, and 2h are discarded into random positions of their respective secondary poker hands 320, 330, and 350. Primary poker hand 112 is again populated, replacing the cards that were discarded therefrom with the 4h, 2s, and Kd in card positions 302, 303, and 305, respectively. The primary poker hand 112 is completed, and therefore, a payout for the primary poker hand 112 and secondary poker hands 114 is determined. Here, there is no payout for the primary poker hand 112, but there is a payout of fifty (50) coins for the straight flush in secondary poker hand 114 as anticipated. To continue play, the player activates machine 100, wagers, and actuates draw control button 36.

With continued reference to FIG. 13, it is seen that secondary poker hand 350 includes three of a kind, i.e., 2h, 2h, and 2s. As described above, an alternate embodiment of the present invention includes cashout control buttons 38 (see FIG. 2) permitting a player to have the option of taking a "discard bonus" before a particular secondary poker hand is completed (i.e., while a secondary poker hand has less than a full hand). Therefore, the player in this example may actuate the cashout control button 38 associated with secondary poker hand 350 at this time and receive a secondary hand bonus payout of five (5) coins for the three of a kind, i.e., 2h, 2h, and 2s. If the player chooses to "cash out" secondary poker hand 350 at this time, the playing cards in that hand are removed. In this example, the player decides not to cash out in the hopes of building a more profitable secondary hand 350, such as four of a kind or a full house.

Another embodiment of video poker machine 100 includes a single cashout control button (not shown) which, if activated, would signal the machine to poll all secondary poker hands 114 each time a set of new cards are dealt to the primary poker hand 112 and to make a payout for any ranking hands achieved. The payout would be made even if the winning combination of cards is acquired before the secondary poker hand is complete.

Figure 14:
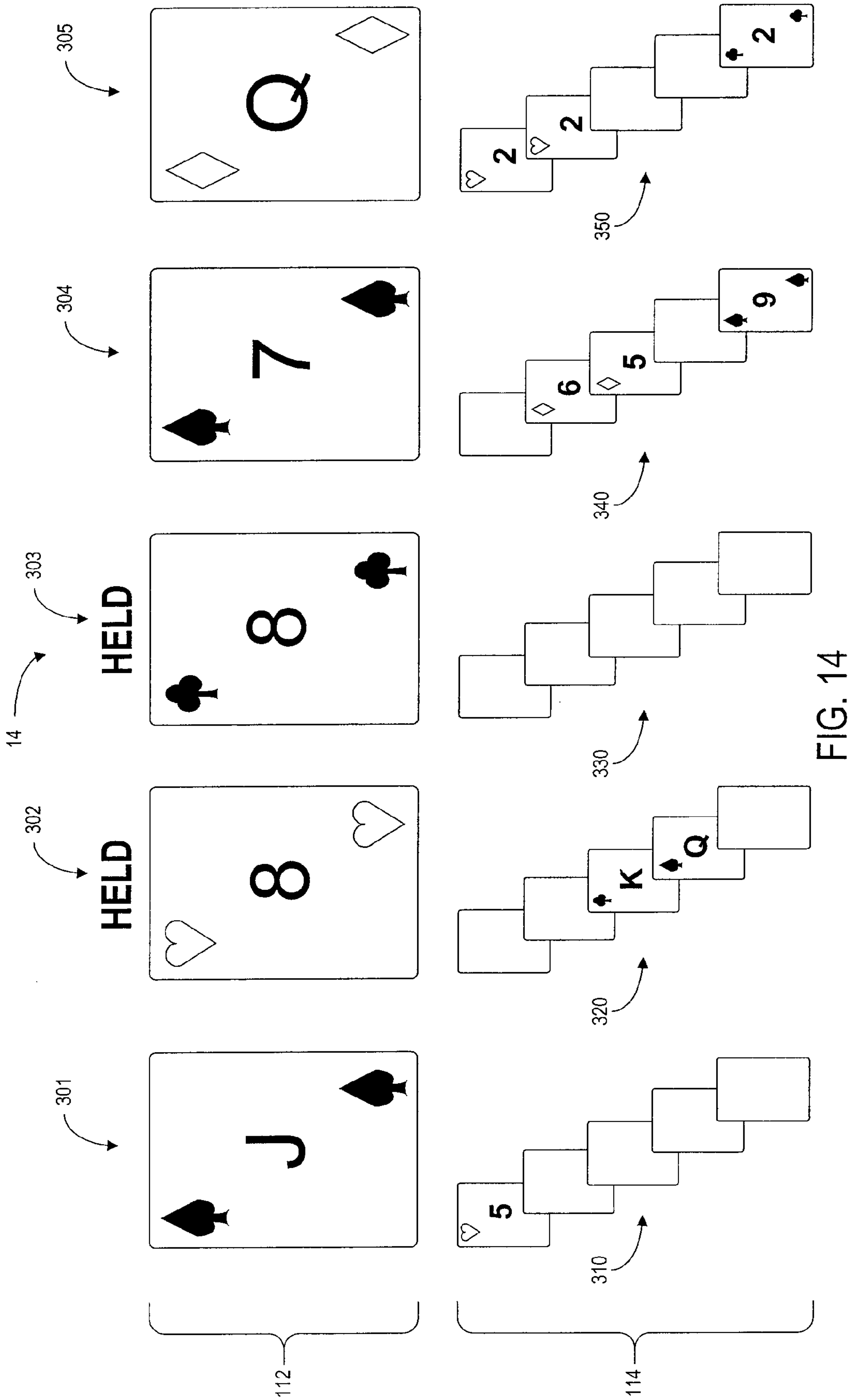

Referring now to FIG. 14, a player is dealt a new primary poker hand 112 and decides to hold the 8h and 8c in card positions 302 and 303, respectively. Thus, the Js, 7s, and Qd in card positions 301, 304, and 305, respectively, are to be discarded by actuating the appropriate hold control buttons 34.

Figure 15:
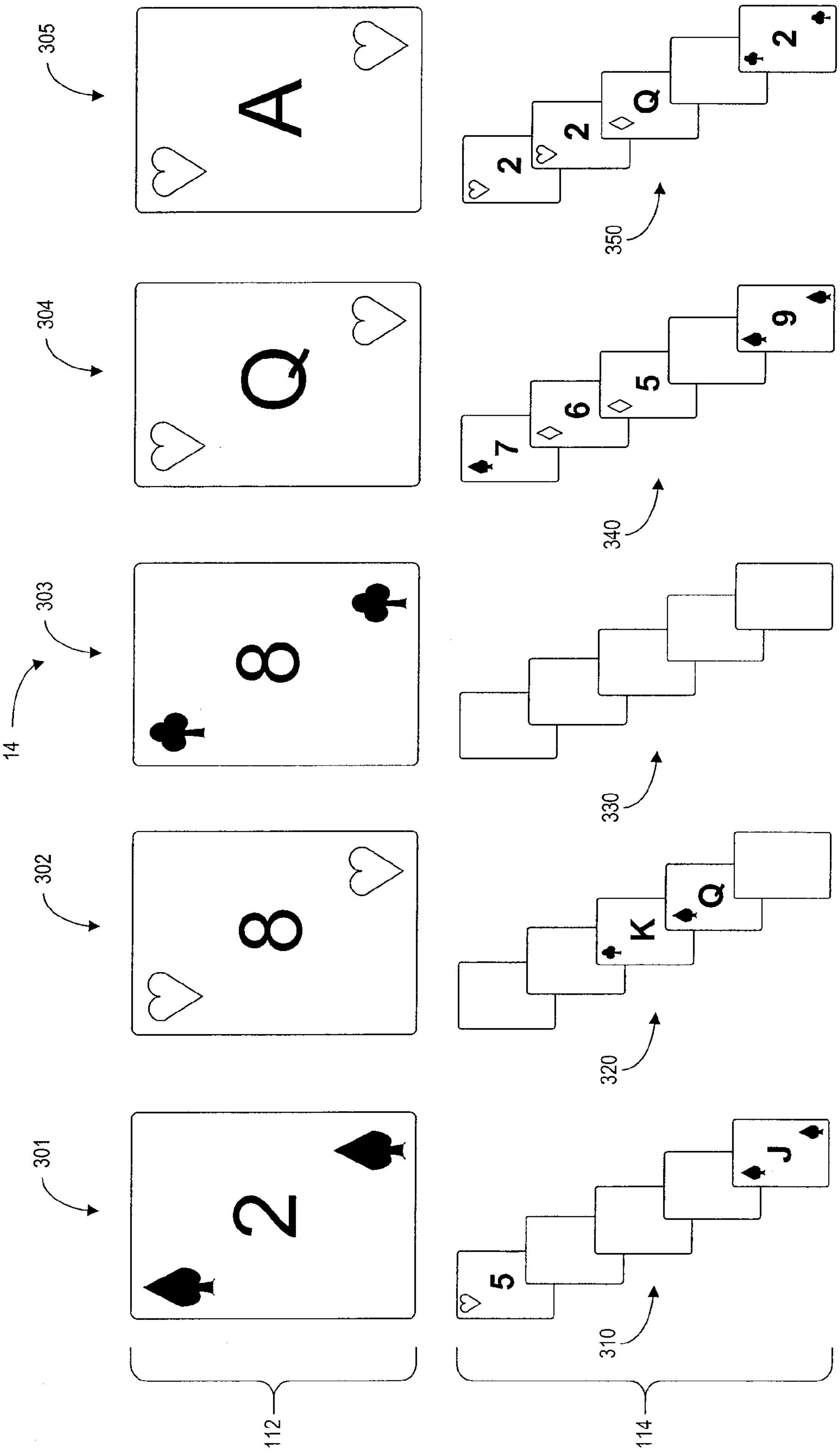

Referring to FIG. 15, upon actuating draw control button 36, the Js, 7s, and Qd are discarded into random positions of secondary poker hands 310, 340, and 350, respectively. Primary poker hand 112 is again populated, replacing the cards that were discarded therefrom with the 2s, Qh, and Ah in card positions 301, 304, and 305, respectively. The primary poker hand 112 is completed, and therefore, a payout for primary poker hand 112 and secondary poker hand 114 is determined. In this example, there is no payout for primary poker hand 112 or for secondary poker hand 114. However, the player is encouraged to extend play because secondary poker hand 340 is close to earning a payout of ten (10) coins for a straight and secondary poker hand 350 is close to earning a payout of twenty-five (25) coins for a four of a kind or twenty (20) coins for a full house. To continue play, the player activates machine 100, wagers, and actuates draw control button 36.

Figure 16:
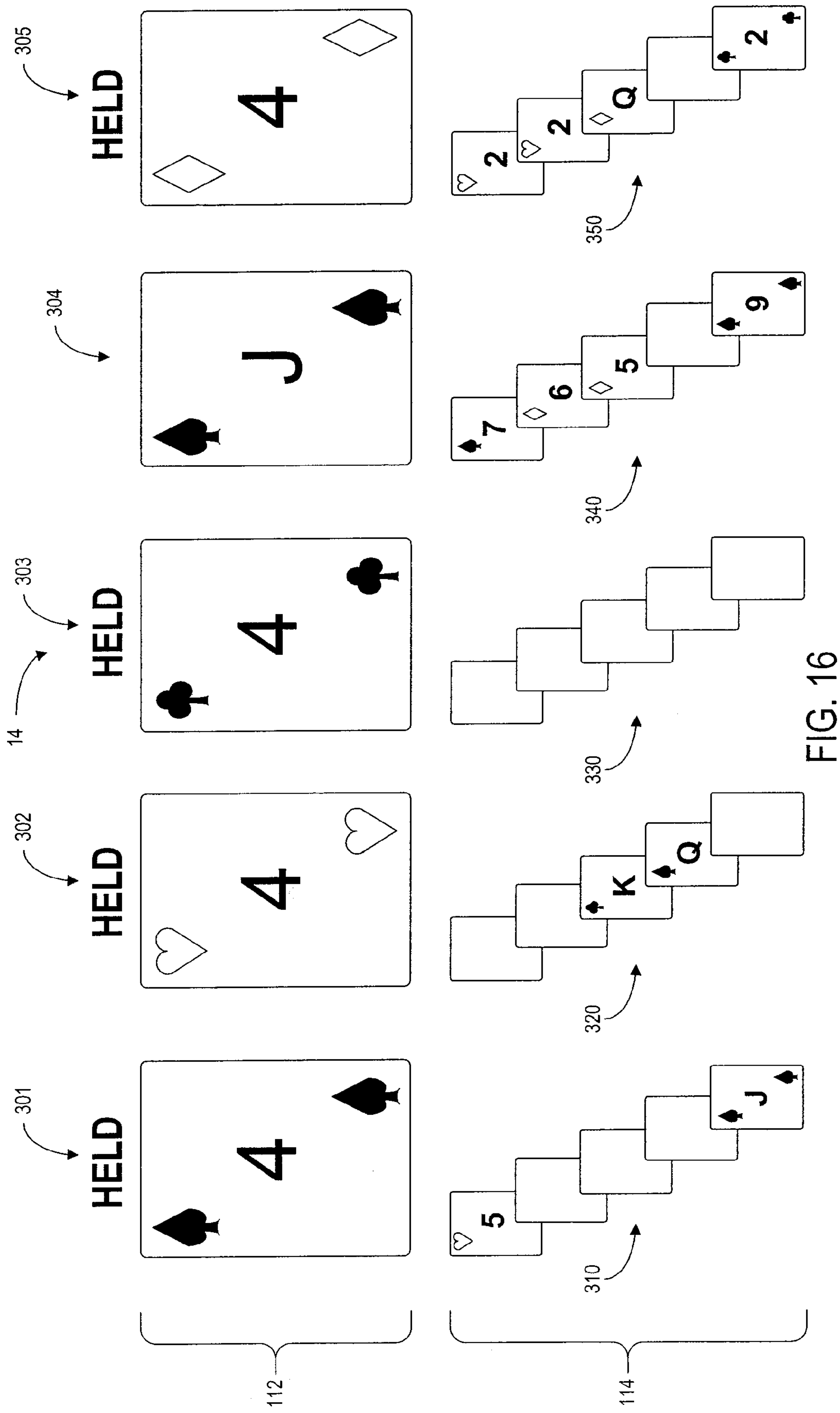
Figure 17:
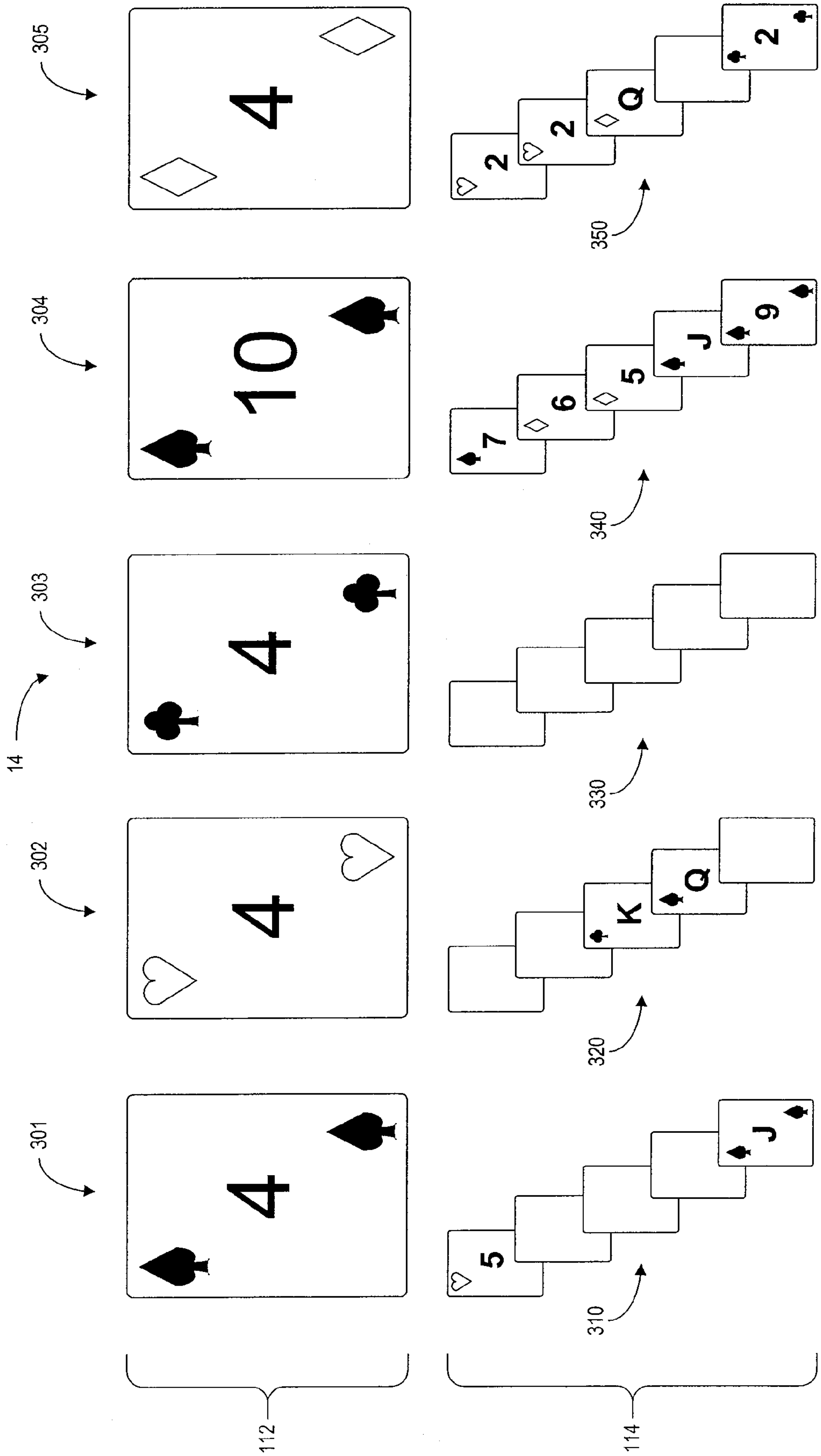

Referring to FIG. 16, a player receives a new primary poker hand 112 and decides to hold the 4s, 4h, 4c, and 4d in card positions 301, 302, 303, and 305, respectively. Thus, the Js in card position 304 is to be discarded by actuating the appropriate hold control buttons 34. Referring to FIG. 17, the player actuates draw control button 36, and the Js is discarded into a random position of secondary poker hand 340. Primary poker hand 112 is again populated, replacing the card that was discarded therefrom with the 10s in card position 304. The primary poker hand 112 is completed, and therefore, a payout for the primary and secondary poker hands 112 and 114 is determined. The payout is for four of a kind in primary poker hand 112, which equates to seventy-five (75) coins if three (3) coins were wagered. No payout has been achieved for any of the secondary poker hands 114. To continue play, the player activates machine 100, wagers, and actuates draw control button 36.

Figure 18:
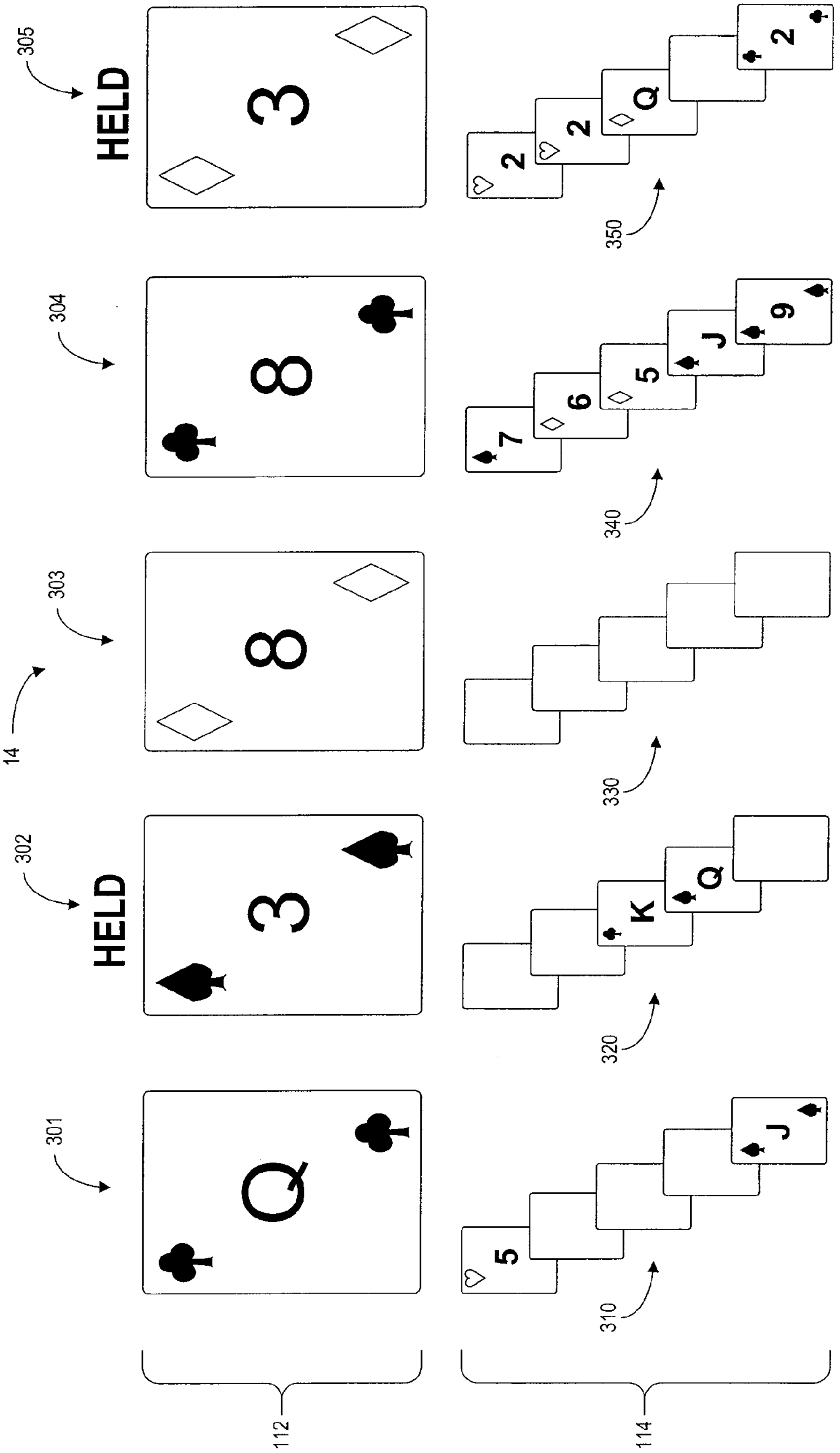

Referring to FIG. 18, a new primary poker hand 112 is dealt, which shows that the player has drawn two pairs, i.e., a pair of threes (3s and 3d) and a pair of eights (8d and 8c). With two pairs the player is guaranteed to receive a payout, e.g., six (6) coins if three (3) coins were wagered. However, the player may decide to try an alternative strategy by discarding the 8c into secondary poker hand 340, thus taking the chance that it will replace the Js. If the player executes this strategy, it may result in a straight and, therefore, a higher payout of ten (10) coins. Those skilled in the art will recognize that the player has a one-in-five chance of obtaining the straight. In this example, the player chooses the alternative strategy by holding the 3s and 3d in card positions 302 and 305, respectively, of primary poker hand 112. The Qc, 8d, and 8c in card positions 301, 303, and 304 are discarded.

Figure 19:
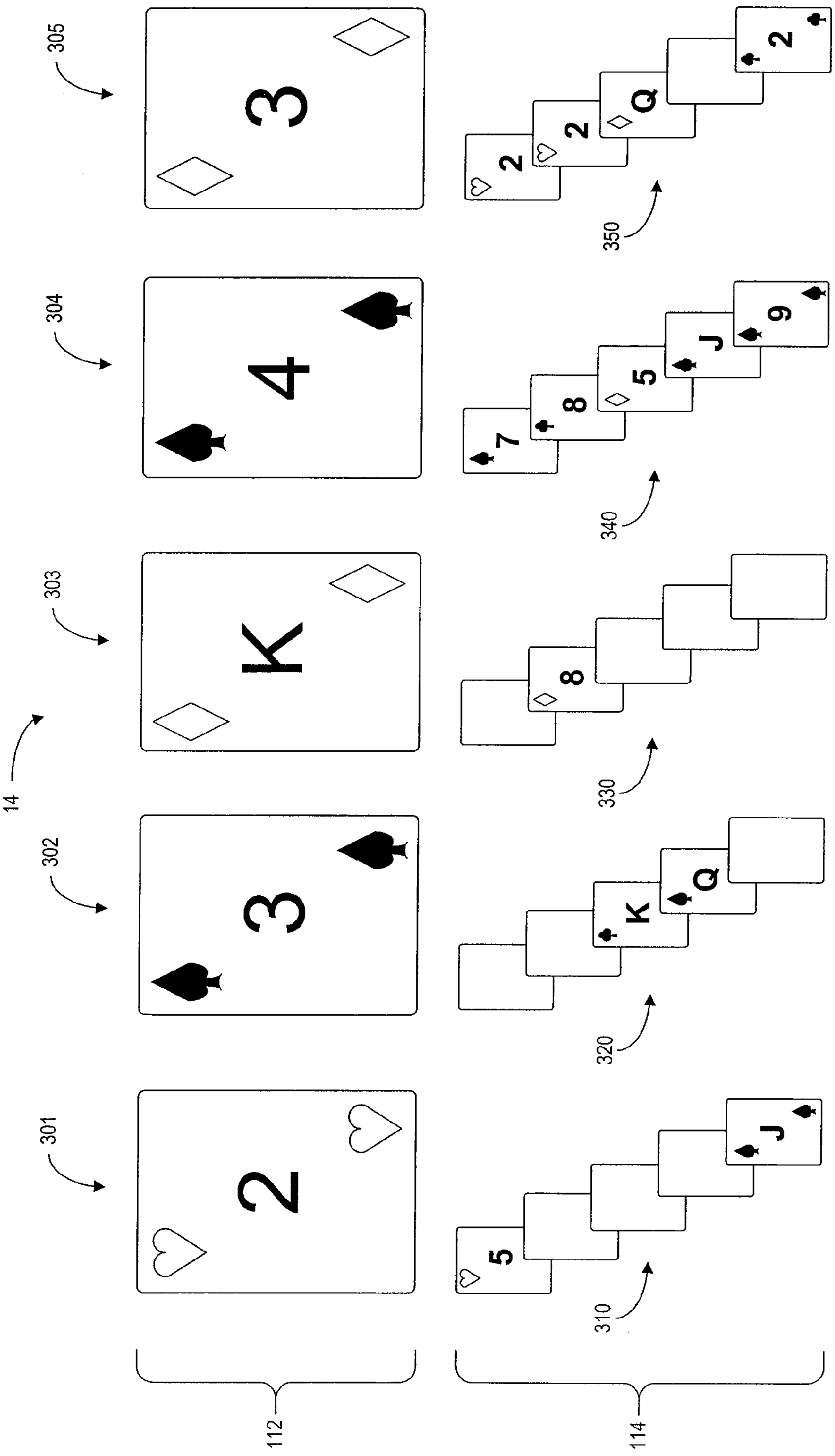

Referring now to FIG. 19, upon actuating the appropriate hold control buttons 34 and draw control button 36, the Qc, 8d, and 8c are discarded into random positions of secondary poker hands 310, 330, and 340, respectively. Primary poker hand 112 is again populated, replacing the cards that were discarded therefrom with the 2h, Kd, and 4s in card positions 301, 303, and 304, respectively. Much to the player's chagrin, the 8c did not replace the Js as desired, but instead replaced the 6d. With the primary poker hand 112 completed, the payout is determined. There is no payout for primary poker hand 112 and there is no payout for any of the secondary poker hands 114. It is readily apparent that the player gave up the "guaranteed" payout in primary poker hand 112 to take a chance on a straight in secondary poker hand 340.

Another embodiment comprises subsequent derivative poker hands, for example a third or even a fourth level of poker hands that receive playing cards from the secondary and tertiary poker hands, respectively. For example, each secondary poker hand may have a third, or tertiary, poker hand which receives the cards discarded from the secondary poker hand. When a playing card in a secondary poker hand is replaced by a discard card from the primary poker hand, the replaced playing card is placed into one of the card positions in the tertiary poker hand. Similar to the examples provided above and illustrated in FIGS. 4 through 19, there may be a tertiary poker hand associated with each of the secondary poker hands. In addition, the playing cards discarded from each secondary poker hand may be randomly discarded into the associated tertiary poker hand. When, for example, the poker game includes tertiary poker hands, the secondary poker hand payout schedule 106 of payout schedule 32 (see FIG. 2) may apply to the tertiary poker hand in the same manner as it applies to the secondary poker hand as described above. Of course, other payout schemes may be used. Any playing card replaced in a tertiary poker hand may be deleted or fall into a pile of cards on the bottom of the display, for example. Alternatively, a further level of poker hands may be used in a similar manner as the tertiary poker hands. Yet another embodiment provides for extra bonuses in the event a winning hand is achieved in one hand of play or for achieving a winning hand in at least one secondary poker hand in a predefined number of sequential games.

Figure 20:
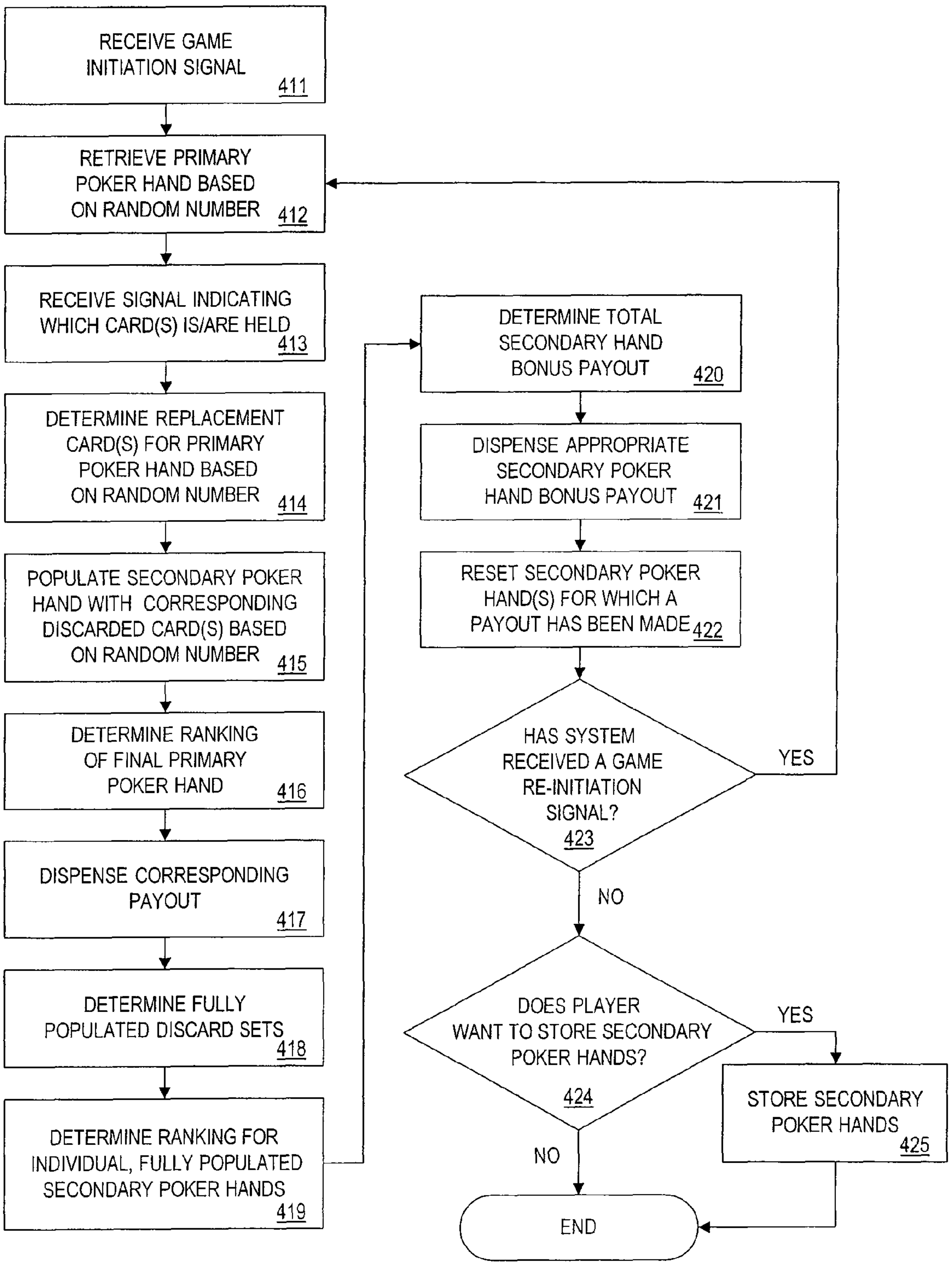
FIG. 20 is a flowchart depicting a process in accordance with one or more embodiments of the present invention.

Referring now to FIG. 20, a flowchart illustrates a process which functions according to one or more embodiments of the present invention. FIGS. 1 and 2 should be considered in conjunction with FIG. 20 for the description that follows. The process followed during a typical game play is controlled by program 30 and includes the step 411 of receiving a game initiation signal from starting controller 40. This occurs when a player inserts a coin into currency acceptor 28 or, alternatively, inserts a player tracking card into card reader 44 of player card interface 42 and actuates start button 41. Step 412 of the process includes generating a primary poker hand 112 by dealing playing cards from one or more decks of cards under the control of random number generator 16 and processor 12.

At step 413, the player's choice of cards in the primary poker hand 112 that are to be "held" is received, for example, when the player actuates one or more hold control buttons 34. The determination represents the player's discard strategy and signals processor 12 to move the cards not held, i.e., the discard cards, from the primary poker hand 112 to a temporary memory. Step 414 includes determining cards that are to replace those cards in the primary poker hand 112 that, as part of the discard strategy, were not held. At step 415, the cards that were placed in temporary memory are transferred into random positions of the associated secondary poker hands 114. More specifically, each card that is discarded from the primary poker hand 112 is placed in random position of a secondary poker hand that corresponds to the card position in primary poker hand 112. For example, a playing card discarded from card position 301 will be randomly placed in secondary poker hand 310, a playing card from card position 302, will be randomly placed in secondary poker hand 320, etc. (see FIG. 4.)

During step 416, the ranking of the final primary poker hand 112 is determined so as to establish the payout, based on payout schedule 32, due to the player. After the payout has been established, processor 12 signals hopper controller 24 to actuate hopper 26 for dispensing the proper number of coins or tokens into tray 110 for the player's receipt at step 417. Alternatively, processor 12 stores the payout in temporary memory and the player has the option of using these winnings as wagers in future game play.

At step 418, the processor 12 determines which secondary poker hands 114 are fully populated (i.e., which secondary poker hands have five (5) cards). During step 419, the ranking of each fully populated secondary poker hand (310 through 350) is determined so as to establish the payout due to the player for each hand based on payout schedule 32. After each payout has been established, the total secondary poker hand payout is determined in step 420 by summing all individual secondary poker hand 114 payouts. Similar to payouts based on the primary poker hand 112, processor 12 signals hopper controller 24 to actuate hopper 26 for dispensing the proper number of coins or tokens into tray 110 for the player's receipt at step 420. Alternatively, processor 12 may store the payout in temporary memory and the player has the option of using these winnings as wagers in future game play.

At step 421, processor 12 resets (i.e., removes) the secondary poker hands for which a payout has been made in preparation for a new game. At step 423, the player has the option of continuing or discontinuing game play. The player continues game play by depositing the number of coins representing his wager or, if he has sufficient credits earned from earlier game play, transferring a wager from temporary memory through, for example, the actuation of start button 41. Thereafter, the player is returned to step 412 and is dealt a new primary poker hand of playing cards.

If the player chooses not to continue game play, processing proceeds to step 424 to give the player the option to store all secondary poker hands 114. If the player chooses the option to store the secondary poker hands 114, the secondary poker hands are stored at step 425. The secondary poker hands 114 can be stored, for example, onto a player tracking card or the data storage device 22. This option allows the player to resume game play at a later time, such as after the player has had time to rest or eat a meal.

Figure 21:
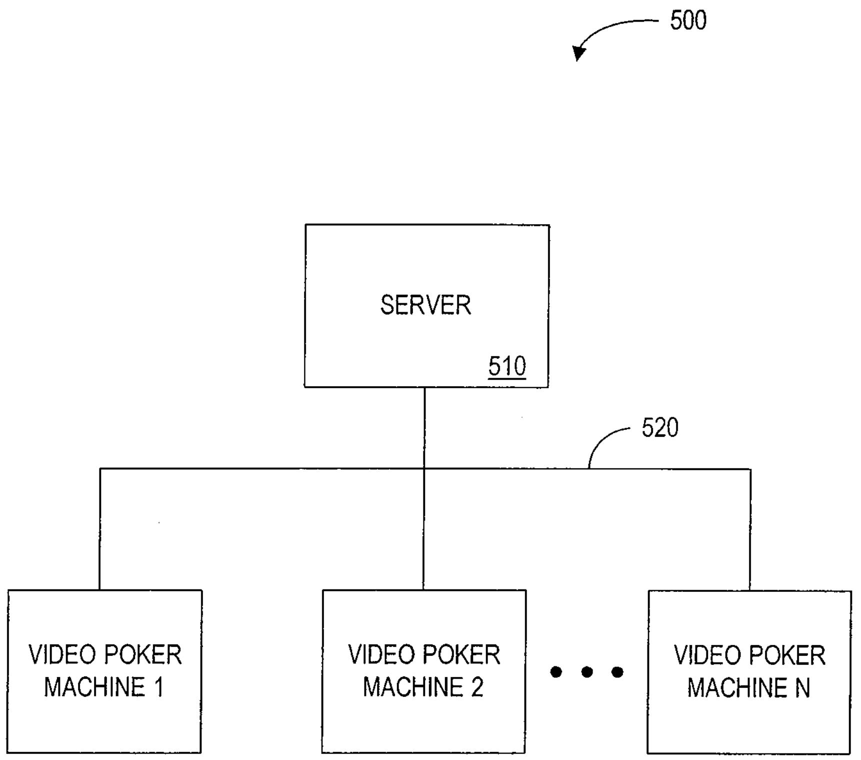
FIG. 21 is a schematic representation of a computer network configured in accordance with one or more embodiments of the present invention.

Referring to FIG. 21, another embodiment of the present invention is schematically shown to include a gaming network 500 which comprises a network server 510 interconnected with a plurality of video poker machines through their network servers 50 (see FIG. 1). Network server 510 comprises a commercially available computer server, such as an IBM RS 6000 or the like. A data communications system 520, which may take the form of a local or wide area network, links the video poker machines to the server. Those skilled in the art will readily appreciate that the precise type of network is not of import and that the network may be wired or wireless. Server 510 allows central processing and storage of data related to the operation of each video poker machine. For example, instead of including a player card interface 42 on each video poker machine for storing a player's secondary poker hands 114 as described hereinabove, the player's secondary poker hands 114 may be stored in the network server 510 under a file name that identifies the player. When storing a player's secondary poker hands 114, the data may be stored in a specific database or under a player identifier, such as the code stored on the player's player tracking card, that is dedicated to that particular player.

In this way, the stored data is readily retrievable for use by the player at a later time.

It is envisioned that the gaming network 500 can be expanded so that all or some of the data manipulation that is normally carried out by the video poker machine 100 is carried out by the network server 510, for example, data processing, random number generation, and data storage. In addition, instead of including currency handling devices 23, a player can be given credits by the casino that are deductible from the player's account stored in the memory of server 510. Such an embodiment can utilize more simplified video poker machines that include only the basic components necessary for game play, e.g., display 14, starting controller 40, player controls 18, network interface 50, and a minimal amount of processing power and memory.

It is further envisioned that expanded gaming services can be incorporated through the use of gaming network 500 which would provide greater convenience for players and larger profits for casinos. For example, network server 510 can include individualized player payout schedules, player gaming attribute variations, and player activity tracking.

In various embodiments of the present invention, the machine 100 may determine at random whether one or more of the cards discarded from the primary poker hand are to be placed in the secondary poker hand(s). In one example, one or more positions of the primary poker hand (e.g., the third position) may be selected by the machine 100 at random, preferably before the primary poker hand is dealt. In some embodiments the machine 100 may not communicate its selection to the player. After the primary poker hand is dealt, if the player elects to discard a card that is in the randomly-selected position, the discarded card is placed in a secondary poker hand. In some embodiments, discarded cards in positions that were not selected by the machine 100 are removed from play altogether, in a conventional manner. In another embodiment, one or more positions of the primary poker hand are selected by machine 100 at random and displayed to the player prior to the deal of the primary hand.

Figure 22:
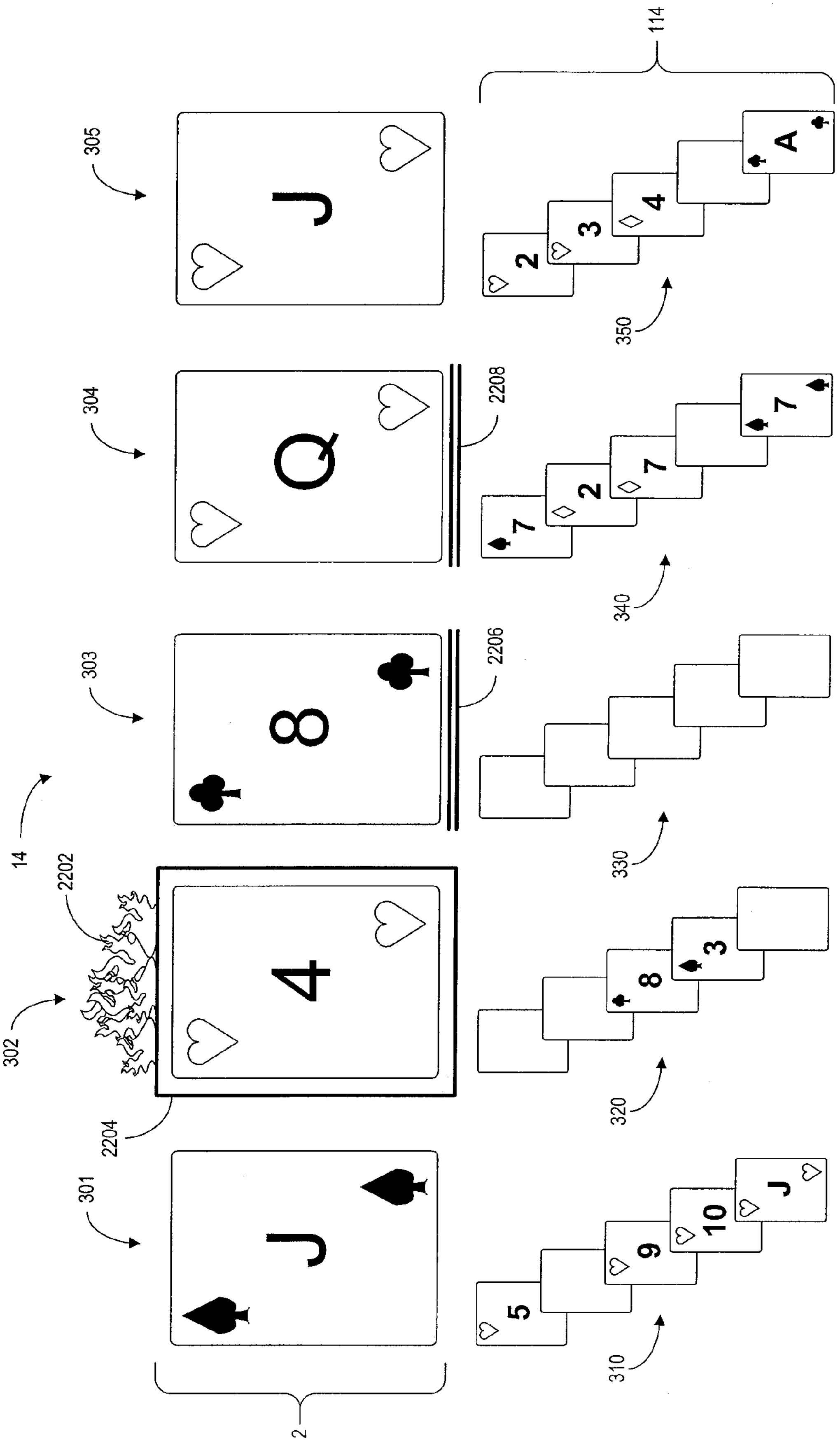
FIG. 22 is an exemplary view of the video display of the video poker gaming device of FIG. 2 in accordance with one or more embodiments of the present invention.

FIG. 22 illustrates two embodiments for displaying the selection of one or more primary hand card positions as discussed herein. In the first exemplary embodiment, card position 302 is highlighted for the player by representing flames 2202 coming out of the top of the card position, and is also emphasized by creating a border 2204 around the card position. In another exemplary embodiment, two card positions are highlighted for the player by adding double underscores 2206 and 2208 directly beneath card positions 303 and 304, respectively. Those of ordinary skill in the art will realize that there are many other ways of highlighting card positions to make them more prominent to the player, and that various techniques may be used alone or in combination.

In another position selection embodiment, after the deal of the primary hand has been completed and the player has received draw cards to replace the indicated discarded cards, machine 100 randomly determines whether or not to select one or more cards of the final hand to populate the secondary hands. If it is determined that one or more cards should be selected, machine 100 then determines the particular card(s) to be placed into the secondary hand.

For example, the player might be dealt Ks Qh Qc 5s 4d and decide to hold the pair of Queens (Qh Qc), discarding Ks 5s 4d. The player draws the 9d 9c Jh to form a final hand of Qh Qc 9d 9c Jh. Machine 100 might then activate a game character (such as an animated Joker character) which walks onto the display screen and surveys the final hand of the player. If no cards are to be selected, the character then walks off the screen without making any alterations. If cards are to be selected, the joker character throws magic dust onto one of the cards—in this example perhaps the 9d. This card then falls below into the secondary hands where it may contribute to a payout for the player. Note that in this embodiment the player may feel as though populating the secondary hand is a special event because it may happen only once every four or five hands, and may thus perceive cards placed into the secondary hand as having greater value.

In still other embodiments, the player indicates which cards are to be discarded, and one or more of the discarded cards are placed into a pot or pool of discarded cards, but are not yet placed into a secondary poker hand. For example, representations of the discarded cards may be moved to a location of the video display designated as the "holding tank." From time to time, periodically, after a predetermined period of time, according to a schedule, and/or at random times, the machine 100 may select one or more of the discarded cards in the pool at random. For example, a session-based machine 100 could sell a prepaid package of 50 video poker hands to the player. Once those hands are completed, the cards accumulated in the holding tank are distributed to the secondary hands and evaluated for payment to the player. In some alternative embodiments, the cards in the "holding tank" are associated with an ordered queue, and are selected from the "holding tank" based on their respective positions in the queue (e.g., first in is the first selected; last in is the last selected). Selected cards are then placed into one or more of the secondary poker hands. In this way, a player may be encouraged to extend a playing session in the hope that a particular discarded card will eventually be "freed" from the holding tank and put into play in a secondary poker hand.

In some embodiments, a player may make an additional payment in order to free a discarded card for placement in a secondary poker hand. For example, the machine 100 may prompt the player with an offer to free a discarded card in exchange for a payment. In another embodiment, the player is offered the opportunity to free a discarded card only when the player follows certain strategies with the initial hand. For example, a player holding four cards to a flush discards one card which is not placed into a secondary hand. But when the player draws two cards to a flush, both discards are placed into a secondary hand.

Figure 23A:
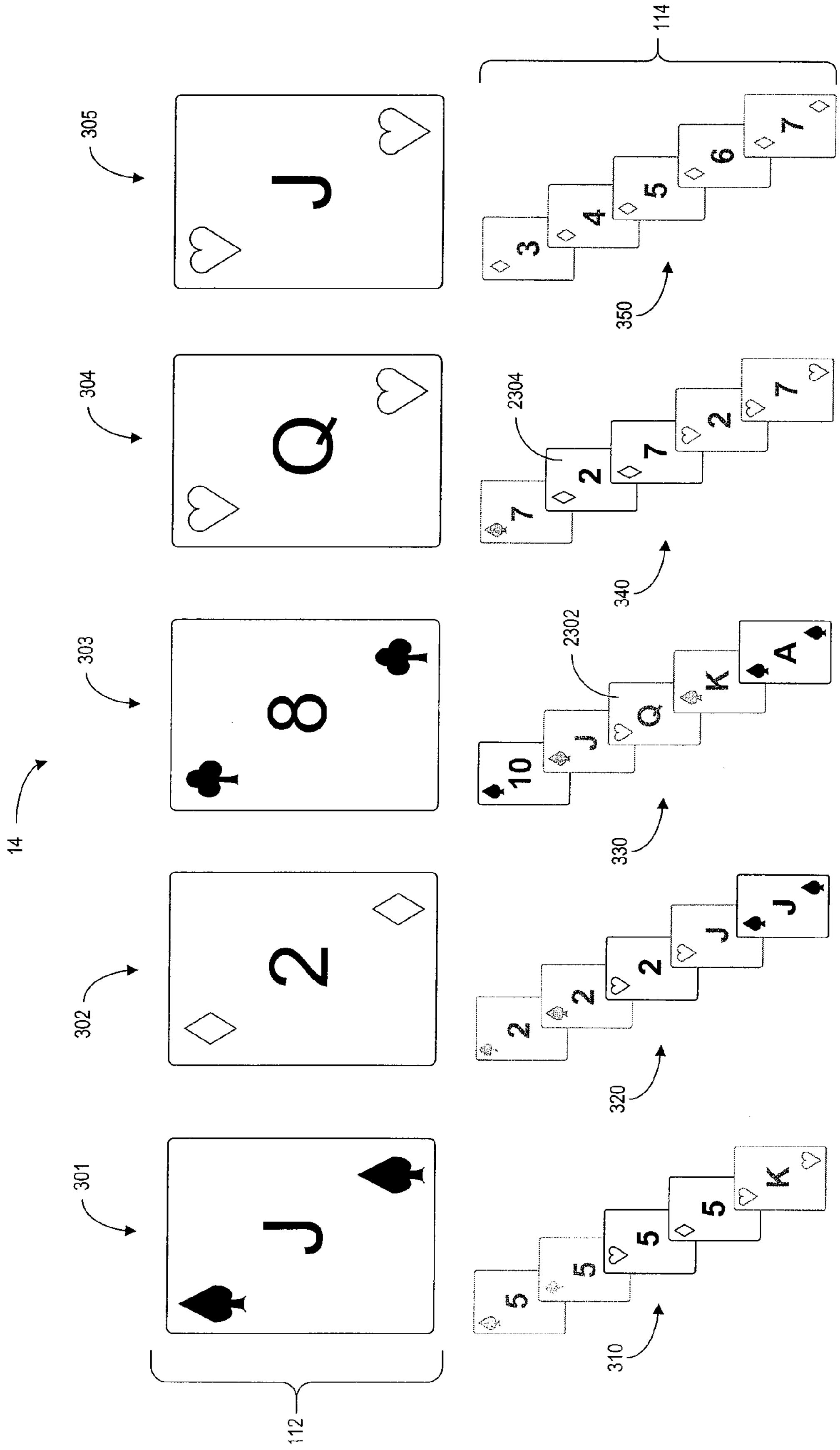
FIGS. 23A and 23B are exemplary views of the video display of the video poker gaming device of FIG. 2 during a gaming session in accordance with one or more embodiments of the present invention.
Figure 23B:
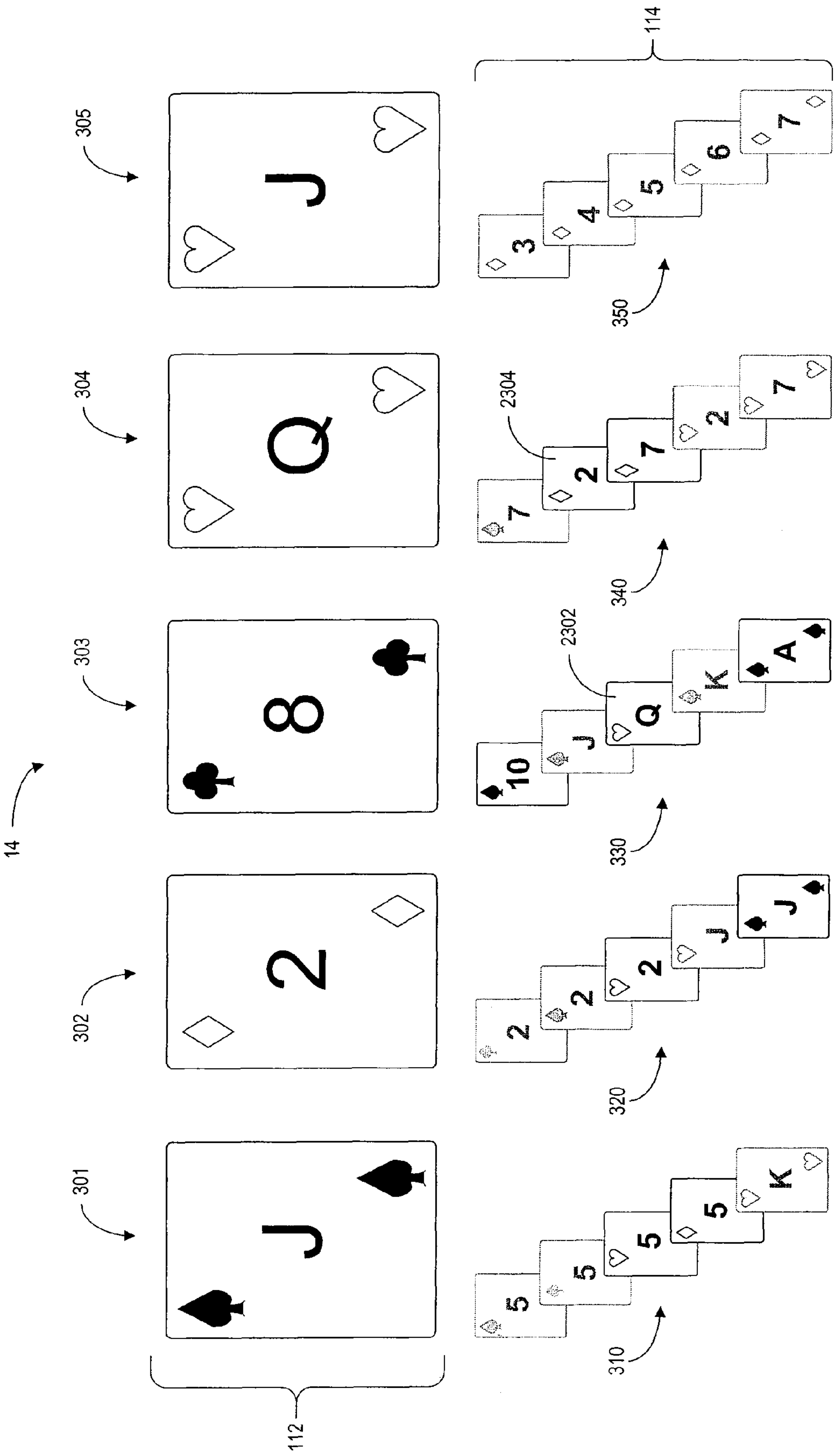

FIGS. 23A and 23B depict other examples of video poker play in accordance with various embodiments of the present invention. In FIG. 23A, exemplary grayed-out cards are shown within secondary hands 310 through 350. Each secondary hand indicates a potentially winning outcome. Hand 350, for example, is a straight flush. But before the player can receive credit for the straight flush, each secondary hand card position must be "filled in" with cards discarded from the primary hand. If any of the cards that the player wishes to discard appears as a grayed-out card in the secondary hands, the discarded card would take that position and "activate" that card position. In the exemplary display of FIG. 23A, secondary hand 330 includes a grayed-out position for Qh. Although the secondary hand 340 contains a position for a 2d, that card position has already been filled (e.g., the position is not grayed out). There is no indicated position in any of the exemplary secondary hands for the 8c.

In this example of play, the player elects to hold the pair of Jacks (Js Jh), discarding the 2d 8c Qh. As depicted in FIG. 23B, card location 2302 (the Qh) is now solid rather than grayed out, indicating that the position 2302 has been activated. Should the player later activate the Js and Ks he could receive a payout for a straight in the secondary hand 330. In this manner, the player may be encouraged to prolong primary hand game play by the prospect of realizing secondary hand rewards. With no position (predetermined or otherwise) to fill in, the discarded 8c and 2d may be removed from play in a conventional manner. Alternatively, as discussed herein, the 8c and/or 2d may be associated with a queue or "holding tank" and placed into a secondary hand in the future.

It is clear from the foregoing disclosure, that the present inventive systems and methods for playing video poker engage a player during game play. In addition, the systems and methods encourage a high amount of game play while at the same time maintains acceptable payback percentages. Further, the systems and methods enable players to develop a variety of gaming strategies so as to generate more interesting and exciting playing action.

Additional Embodiments

As discussed herein, a payout may be determined for a player based on the ranking of a secondary poker hand. According to one or more embodiments of the present invention, players may be awarded various other types of benefits based on a secondary poker hand. For example, a player may be awarded a wild card, or any other type of card, in the primary poker hand. In another example, one or more additional card positions may be included with the primary poker hand, thereby increasing a player's chances of achieving a winning hand. For instance, a player may then be dealt six cards instead of five, and payouts may continue to be awarded based on a five-card payout table.

In some embodiments of the present invention, two or more secondary poker hands may share one or more cards or card positions in common. In one example, two secondary poker hands may be displayed as intersecting or crossing at a common, shared card position. A display of two or more secondary sets of card positions may thus be similar to the layout of a crossword puzzle. A discarded card placed in a common position may be used by either secondary poker hand. One or more common positions may be associated with a predetermined card, suit, and/or rank, as discussed herein.

In other embodiments of the present invention, different secondary hands may be associated with different benefits (e.g., comps, payouts, etc.). For example, a first secondary hand may be associated with a beverage comp, while a second secondary hand may be associated with a buffet comp. Thus, machine 100 may be configured to authorize and/or issue different comps according to which secondary hand is adequately populated with discarded cards.

Further, in other embodiments of the present invention, discarded cards may populate secondary hand positions by "displacing" previously discarded cards from their respective positions, thereby shifting the previously discarded cards to adjacent positions. For example, where a player discards a first card from a primary hand, the discarded card may first occupy a first position in a first secondary hand. Then, when the player discards a second card from the primary hand, the second card would be placed in the first position in the first secondary hand, and the first discarded card would be "displaced" from the first position in the first secondary hand and moved to the second position in the first secondary hand. In embodiments where secondary hands are comprised of five card positions, after players discard five cards from the primary hand and thereby populate all positions of the first secondary hand, the next discarded card may cause all previously discarded cards in the first secondary hand to be displaced and shifted as described, with the card occupying the fifth position of the first secondary hand moving to the first position of a second secondary hand. Many secondary hands can be employed, so that discarded cards may be potentially displaced into different secondary hands. In this manner, each discarded card functions to shift all previously discarded cards one position further away from the first position in the first secondary hand.

Further still, in some embodiments where different benefits are associated with different secondary hands, those secondary hands associated with higher value benefits may be more difficult to achieve, or unlikely to be achieved, by the player. For example, in order for a player to earn a relatively low value comp such as a buffet comp, a player may be required to achieve a straight in a first secondary hand with discarded cards. In order for a player to earn a relatively higher value comp such as a free room night, however, a player may be required to achieve a straight flush in a second secondary hand with discarded cards. Thus, because the odds of achieving a straight flush are lower than the odds of achieving a straight, the player must theoretically play for a longer period in order to earn a hotel room stay.

Alternatively or additionally, other methods can be employed to make higher value benefits more difficult to obtain, including, for example: (1) associating different time limits with secondary hands (and/or secondary hand positions) so that secondary hands yielding greater value benefits must be achieved within relatively shorter periods of time; (2) associating time limits with particular discarded cards or secondary hand card positions so that discarded cards "expire" and thereby disappear from secondary hands at the end of a time interval; and/or (3) in embodiments where subsequently discarded cards "displace" previously discarded cards from secondary hand positions, positioning secondary hands associated with lower value benefits so that they are populated first, and secondary hands associated with higher value benefits so that they are populated later, when more cards are discarded from the primary hand (i.e. so that more primary hands must be played before the secondary hands corresponding to higher value benefits are populated with discarded cards).

In yet other embodiments of the present invention, rather than having cards discarded from the primary hand populate the secondary hands, cards that are held by the player populate the secondary hand. For example, a player might be dealt an initial hand of Jh Js 4d 6c 8s. He elects to hold the pair of jacks, and is dealt the 8d Qs 9c for a final hand of Jh Js 8d Qs 9c. After the three draw cards are provided, machine 100 creates a "copy" of the two jacks and places them into the secondary hands. Alternatively, after the final hand has been paid the cards that were held (in this case the two jacks) are then placed into the secondary hand by removing them from the primary hand. Of course, any combination of draw cards and/or held cards could be used to populate one or more secondary hands.

It will be understood that many of the embodiments and variations discussed herein with respect to discarded cards may be used with respect to cards that are held in a primary hand and then replicated in a secondary card hand, or otherwise selected for placement into a secondary card hand. For example, the embodiments directed to how a secondary hand is populated may apply to discarded and/or held cards.

Although the system and method disclosed herein has been described with respect to various specific embodiments, it is apparent that modifications, changes and enhancements can be made thereto without departing from the spirit and scope of the invention as defined by the appended claims.

The invention is claimed as follows:

1. A gaming system comprising:

at least one display device;

at least one input device;

at least one processor; and at least one memory device which stores a plurality of instructions, which when executed by the at least one processor, cause the at least one processor to operate with the at least one display device and the at least one input device to:

(a) display a plurality of primary playing card positions and a plurality of secondary playing card positions;

(b) for each displayed primary playing card position:

(i) randomly determine a playing card from a plurality of playing cards, and (ii) display the randomly determined playing card at said primary playing card position;

(c) enable a player to discard at least one of said displayed playing cards from at least one of the primary playing card positions;

(d) if the player discarded any of the displayed playing cards:

(i) for each discarded playing card:

(A) randomly determine a replacement playing card from the plurality of playing cards, and (B) display said replacement playing card at the primary playing card position of said discarded playing card, (ii) determine whether to accumulate any of said discarded playing cards in any of the plurality of secondary playing card positions, and (iii) if the determination is to accumulate at least one of said discarded playing cards in at least one of the secondary playing card positions, display said discarded playing cards at said secondary playing card positions;

(e) after displaying any replacement playing cards at the primary playing card positions, display any primary playing card position award associated with the player cards displayed at the plurality of primary playing card positions; and (f) if a designated quantity of the secondary playing card positions each display one of the discarded playing cards, display any secondary playing card position award associated with said discarded playing cards displayed at the secondary playing card positions.

2. The gaming system of claim 1, wherein when executed by the at least one processor, the plurality of instructions cause the at least one processor to repeat (b) to (f) at least once.

3. The gaming system of claim 1, wherein each secondary playing card position is associated with one of the primary playing card positions.

4. The gaming system of claim 3, wherein when executed by the at least one processor, the plurality of instructions cause the at least one processor to display the discarded playing card at the secondary playing card position associated with the primary playing card position of the discarded playing card if the determination is to accumulate at least one of said discarded playing cards in at least one of the secondary playing card positions.

5. The gaming system of claim 1, wherein a designated one of the playing cards is associated with a designated one of the secondary playing card positions.

6. The gaming system of claim 5, wherein when executed by the at least one processor, the plurality of instructions cause the at least one processor to display the designated playing card at the designated secondary playing card position if the designated playing card is randomly determined, the designated playing card is discarded and the determination is to accumulate at least one of said discarded playing cards in at least one of the secondary playing card positions.

7. The gaming system of claim 1, wherein when executed by the at least one processor, the plurality of instructions cause the at least one processor to display each discarded playing card at one of the secondary playing card positions if the determination is to accumulate at least one of said discarded playing cards in at least one of the secondary playing card positions.

8. The gaming system of claim 1, wherein said determination of whether to accumulate any of said discarded playing cards in any of the plurality of secondary playing card positions is based on at least one of any discarded playing cards displayed at the secondary playing card positions.

9. The gaming system of claim 1, wherein when executed by the at least one processor, the plurality of instructions cause the at least one processor to enable the player to designate which secondary playing card position to display at least one of the discarded playing cards if the determination is to accumulate at least one of said discarded playing cards in at least one of the secondary playing card positions.

10. The gaming system of claim 1, wherein when executed by the at least one processor, the plurality of instructions cause the at least one processor to randomly determine whether to accumulate any of said discarded playing cards in any of the plurality of secondary playing card positions.

11. The gaming system of claim 1, wherein when executed by the at least one processor, the plurality of instructions cause the at least one processor to display a plurality of sets of secondary playing card positions and if the determination is to accumulate at least one of said discarded playing cards in at least one of the secondary playing card positions, display each discarded playing card at one of the secondary playing card positions of one of the sets of secondary playing card positions.

12. The gaming system of claim 1, wherein the designated quantity of secondary playing card positions includes each of the plurality of secondary playing card positions.

13. A method of operating a gaming system, said method comprising:
- (a) causing at least one display device to display a plurality of primary playing card positions and a plurality of secondary playing card positions;
- (b) for each displayed primary playing card position:
  - (i) randomly determining a playing card from a plurality of playing cards, and
  - (ii) causing the at least one display device to display the randomly determined playing card at said primary playing card position;
- (c) enabling a player to discard at least one of said displayed playing cards from at least one of the primary playing card positions;
- (d) if the player discarded any of the displayed playing cards:
  - (i) for each discarded playing card:
    - (A) randomly determining a replacement playing card from the plurality of playing cards, and
    - (B) causing the at least one display device to display said replacement playing card at the primary playing card position of said discarded playing card,
  - (ii) determining whether to accumulate any of said discarded playing cards in any of the plurality of secondary playing card positions, and
  - (iii) if the determination is to accumulate at least one of said discarded playing cards in at least one of the secondary playing card positions, causing the at least one display device to display said discarded playing cards at said secondary playing card positions;
- (e) after displaying any replacement playing cards at the primary playing card positions, causing the at least one display device to display any primary playing card position award associated with the player cards displayed at the plurality of primary playing card positions; and
- (f) if a designated quantity of the secondary playing card positions each display one of the discarded playing cards, causing the at least one display device to display any secondary playing card position award associated with said discarded playing cards displayed at the secondary playing card positions.

14. The method of claim 13, which includes repeating (b) to (f) at least once.

15. The method of claim 13, wherein each secondary playing card position is associated with one of the primary playing card positions.

16. The method of claim 15, which includes causing the at least one display device to display the discarded playing card at the secondary playing card position associated with the primary playing card position of the discarded playing card if the determination is to accumulate at least one of said discarded playing cards in at least one of the secondary playing card positions.

17. The method of claim 13, wherein a designated one of the playing cards is associated with a designated one of the secondary playing card positions.

18. The method of claim 17, which includes causing the at least one display device to display the designated playing card at the designated secondary playing card position if the designated playing card is randomly determined, the designated playing card is discarded and the determination is to accumulate at least one of said discarded playing cards in at least one of the secondary playing card positions.

19. The method of claim 13, which includes causing the at least one display device to display each discarded playing card at one of the secondary playing card positions if the determination is to accumulate at least one of said discarded playing cards in at least one of the secondary playing card positions.

20. The method of claim 13, wherein said determination of whether to accumulate any of said discarded playing cards in any of the plurality of secondary playing card positions is based on at least one of any discarded playing cards displayed at the secondary playing card positions.

21. The method of claim 13, which includes enabling the player to designate which secondary playing card position to display at least one of the discarded playing cards if the determination is to accumulate at least one of said discarded playing cards in at least one of the secondary playing card positions.

22. The method of claim 13, which includes randomly determining whether to accumulate any of said discarded playing cards in any of the plurality of secondary playing card positions.

23. The method of claim 13, which includes causing the at least one display device to display a plurality of sets of secondary playing card positions and if the determination is to accumulate at least one of said discarded playing cards in at least one of the secondary playing card positions, display each discarded playing card at one of the secondary playing card positions of one of the sets of secondary playing card positions.

24. The method of claim 13, wherein the designated quantity of secondary playing card positions includes each of the plurality of secondary playing card positions.

25. The method of claim 13, which is provided through a data network.

26. The method of claim 25, wherein the data network is an internet.

* * * * *

UNITED STATES PATENT AND TRADEMARK OFFICE

CERTIFICATE OF CORRECTION

PATENT NO. : 8,636,573 B2
APPLICATION NO. : 12/784100
DATED : January 28, 2014
INVENTOR(S) : Jay S. Walker et al.

It is certified that error appears in the above-identified patent and that said Letters Patent is hereby corrected as shown below:

IN THE CLAIMS

In Claim 1, Column 18, Line 46, replace “player” with --playing--.
In Claim 9, Column 19, Lines 27 to 28, between “designate” and “which” insert --at--.
In Claim 13, Column 20, Line 15, replace “player” with --playing--.
In Claim 21, Column 20, Line 57, between “designate” and “which” insert --at--.

Signed and Sealed this
Fifth Day of August, 2014

Michelle K. Lee
*Deputy Director of the United States Patent and Trademark Office*